US012736698B2

(12) United States Patent
Yan et al.

(10) Patent No.: US 12,736,698 B2
(45) Date of Patent: Sep. 15, 2026

(54) METHOD FOR SIMULTANEOUS INVERSION OF FIVE RESERVOIR PARAMETERS OF SUBMARINE GAS RESERVOIRS USING P-WAVE VELOCITY AND DENSITY DATA

(71) Applicants: South China Sea Institute of Oceanology, Chinese Academy of Sciences, Guangzhou (CN); Yuning Yan, Guangzhou (CN)

(72) Inventors: Yuning Yan, Guangzhou (CN); Zhongxian Zhao, Guangzhou (CN); Gang Hao, Beijing (CN); Lele Wei, Beijing (CN)

(73) Assignees: South China Sea Institute of Oceanology, Chinese Academy of Sciences, Guangzhou (CN); Yuning Yan, Guangzhou (CN)

( * ) Notice: Subject to any disclaimer, the term of this patent is extended or adjusted under 35 U.S.C. 154(b) by 0 days.

(21) Appl. No.: 19/432,887

(22) Filed: Dec. 24, 2025

(65) Prior Publication Data

US 2026/0118539 A1 Apr. 30, 2026

(30) Foreign Application Priority Data

Oct. 14, 2025 (CN) ........................ 202511468404.8

(51) Int. Cl.
*G01V 1/30* (2006.01)

(52) U.S. Cl.
CPC .............. *G01V 1/306* (2013.01); *G01V 1/303* (2013.01); *G01V 2210/6222* (2013.01); *G01V 2210/624* (2013.01)

(58) Field of Classification Search
CPC .................. G01V 1/306; G01V 1/303; G01V 2210/6222; G01V 2210/624
See application file for complete search history.

(56) References Cited

U.S. PATENT DOCUMENTS 11,215,721 B2 * 1/2022 Roure .................... G01V 1/301
12,320,944 B1 * 6/2025 Tao ........................ G01V 1/282
(Continued)

OTHER PUBLICATIONS

U Tinivella, A method for estimating gas hydrate and free gas concentrations in marine sediments, Bollettino Di Geofisica Teorica Ed Applicata, vol. 40, N. 1, pp. 19-30, Mar. 1999.
(Continued)

*Primary Examiner* — Manuel A Rivera Vargas
(74) *Attorney, Agent, or Firm* — Hemisphere Law, PLLC

(57) ABSTRACT

A method for simultaneous inversion of five reservoir parameters of submarine gas reservoirs using P-wave velocity and density data, comprising: acquiring an observed P-wave velocity, an observed density, and a reservoir distribution range and constructing a P-wave velocity model and a bulk density model. Obtaining variable ranges of five reservoir parameters from geological experience, and setting unknown variables to be inverted, and constructing an optimization problem. Using an interior-point algorithm to iteratively solve the optimization problem, outputting optimal inversion values and consolidation factors for the five reservoir parameters. Obtaining the 2D/3D P-wave velocity profile and a 2D/3D density profile; using the optimal consolidation factor, inputting them into the optimization problem constructed with the P-wave velocity model and the bulk density model, repeating the inversion process for each CDP trace to invert the five reservoir parameters for each depth point.

18 Claims, 11 Drawing Sheets

(56) References Cited

U.S. PATENT DOCUMENTS

| | | | | |
|---|---|---|---|---|
| 12,332,398 | B1 * | 6/2025 | Xiao | G01V 11/002 |
| 12,378,881 | B2 * | 8/2025 | Liu | E21B 49/005 |
| 2018/0017690 | A1 * | 1/2018 | Tan | G01V 1/282 |
| 2018/0058211 | A1 * | 3/2018 | Liang | E21B 44/00 |
| 2025/0389860 | A1 * | 12/2025 | Hu | G01V 1/306 |

OTHER PUBLICATIONS

Yuning Yan, Hongbing Li, Gang Hao et al., Simultaneous inversion of five physical parameters of submarine gas reservoir from synthetic elastic impedance for high-efficiency reserve evaluation, Journal of Petroleum Exploration and Production Technology (2025) 15:68, Mar. 12, 2025, https://doi.org/10.1007/s13202-025-01968-y.

Leonardo B. Monachesi, Uri Wollner, and Jack Dvorkin, Effective Pore Fluid Bulk Modulus at Patchy Saturation An Analytic Study, Journal of Geophysical Research: Solid Earth, Jan. 3, 2020, 10.1029/2019JB018267.

R Hill, The Elastic Behaviour of a Crystalline Aggregate, 1952, Proc. Phys. Soc. A 65 349-354, DOI 10.1088/0370-1298/65/5/307.

Myung Woong Lee, Predicting S-Wave Velocities for Unconsolidated Sediments at Low Effective Pressure, Aug. 2018, USGS, https://www.researchgate.net/publication/327057807.

Trehu, A.M., Bohrmann, G., Rack, F.R., Torres, M.E., et al., 2003 Proceedings of the Ocean Drilling Program, Initial Reports vol. 204, SITE 1245.

T. Collett, M. Riedel, J. Cochran, R. Boswell, J. Presley, P. Kumar, A. Sathe, A. Sethi, M. Lall, and the National Gas Hydrate Program Expedition 01 Scientists, 2015, Sites NGHP-01-14.

Paull, C.K., Matsumoto, R., Wallace, P.J., et al, 1996 Proceedings of the Ocean Drilling Program, Initial Reports, vol. 164, site 997.

Richard H. Byrd, Mary E. Hribar, and Jorge Nocedal, an Interior Point Algorithm for Large-Scale Nonlinear Programming, 1999 Society for Industrial and Applied Mathematics, vol. 9, No. 4, pp. 877-900.

Rafael Amaral Cataldo, Impact of mineralogy on rock physics modeling: a Brazilian pre-salt case study, Emilson Pereira Leite, 2022.

Riedel, M., Collett, T.S., Malone, M.J., and the Expedition 311 Scientists Proceedings of the Integrated Ocean Drilling Program, vol. 311, Site U1329, 2006.

M.W. Lee and T.S. Collett, Gas Hydrate and Free Gas Saturations Estimated From Velocitylogs on Hydrate Ridge, Off Shore Oregon, Jan. 13, 2006, USA Proceedings of the Ocean Drilling Program, Scientific Results vol. 204.

* cited by examiner acquiring an observed P-wave velocity, an observed density, and a reservoir distribution range through a logging equipment, and measuring an actual valve of a free gas saturation, a porosity, and mineral component ratios of a rock skeleton to validate inversion accuracy, constructing a P-wave velocity model and a bulk density model of the a reservoir rock using a simplified two-phase Biot equation, a weighted average equation of mixed fluid, and a volume density equation

S100 obtaining experienced range values of a free gas saturation, a range of the porosity, and a range of each of the mineral composition ratios; setting the free gas saturation, the porosity, a clay content, a carbonate content, and a water-gas mixture calibration factor as unknown variables to be inverted in the P-wave velocity model and the bulk density model; associating the P-wave velocity model with the observed P-wave velocity and the bulk density model with the observed density; and constructing an optimization problem corresponding to multi-dimensional nonlinear with a goal of minimizing a sum of mean squared errors between model-calculated values and observed values, while setting variable ranges for each inverted unknown variables

S200 after constructing the optimization problem, simultaneously obtaining values of the five reservoir parameters from logging data and initial iteration values, with the initial iteration values randomly selected within the variable ranges; using an interior-point algorithm to iteratively solve the optimization problem, adjusting a consolidation factor of reservoir distribution points during a solution process, and judging inversion accuracy by calculating a root mean square error between the inversion result and the observed reservoir parameters, until obtaining a minimum mean square error outputting optimal inversion values and consolidation factors for the five reservoir parameters, with the inversion values used to validate inversion accuracy

S300 during a prediction process of the 2D reservoir parameter prediction or the 3D reservoir parameter, acquiring submarine gas reservoir seismic data collected by a seismic equipment, inverting the submarine gas reservoir seismic data to obtain the 2D P-wave velocity profile or the 3D P-wave velocity profile and a 2D density profile or a 3D density profile; using the optimal consolidation factor, inputting the 2D P-wave velocity profile or 3D P-wave velocity profile, the 2D density profile or the 3D density profile into the optimization problem constructed with the P-wave velocity model and the bulk density model, repeating the inversion process for each seismic common depth point (CDP) trace to invert the five reservoir parameters for each depth point; outputting a 2D reservoir parameter distribution profile or a 3D reservoir parameter distribution profile of the submarine gas reservoir

METHOD FOR SIMULTANEOUS INVERSION OF FIVE RESERVOIR PARAMETERS OF SUBMARINE GAS RESERVOIRS USING P-WAVE VELOCITY AND DENSITY DATA

CROSS-REFERENCE TO RELATED APPLICATIONS

This application claims foreign priority of Chinese Patent Application No. 202511468404.8, filed on Oct. 14, 2025 in the China National Intellectual Property Administration, the disclosures of all of which are hereby incorporated by reference.

TECHNICAL FIELD

The present disclosure relates to the technical field of submarine gas reservoir exploration, in particular to a method for simultaneous inversion of five reservoir parameters of submarine gas reservoirs using P-wave velocity and density data.

BACKGROUND

Natural gas, as a low-pollution, high-calorific value energy source, has attracted considerable attention. Submarine gas reservoirs have vast reserves, and the free gas saturation and porosity are key parameters for evaluating their reserves and development potential. Currently, well logging and seismic exploration technologies are primarily relied upon: well logging is highly accurate but expensive and limited in coverage; seismic exploration has a wide range and low cost, but it is difficult to quantitatively determine reservoir parameters. Therefore, there is an urgent need for a method based on P-wave velocity and density data to construct quantitative inversion of key parameters.

Existing seismic rock-physics-based prediction methods have significant flaws: they rely on empirical equations (U Tinivella, a method for estimating gas hydrate and free gas concentrations in marine sediments, bollettino di geofisica teorica ed applocata, volume 40, N. 1, pp. 19-30 (hereinafter Tinivella et al. 1999)) without clear physical meaning, require the prior acquisition of difficult-to-obtain mineral composition ratio or porosity data of rock, or depend on complex elastic impedance profile data, which limits their practicality. Moreover, reservoir parameters generally exhibit strong heterogeneity, making it challenging to achieve high-precision and high-efficiency inversion of key reservoir parameters, thus failing to meet the practical needs of deepwater natural gas exploration and development.

From the above, it is evident that how to meet the actual needs of deepwater natural gas exploration and development remains an unresolved issue.

SUMMARY

The present disclosure provides a method for simultaneous inversion of five reservoir parameters of submarine gas reservoirs using P-wave velocity and density data, to solve to meet the practical needs of deepwater natural gas exploration and development.

To realize the above objective, the present disclosure provides a method for simultaneous inversion of five reservoir parameters of submarine gas reservoirs using P-wave velocity and density data, including: acquiring an observed P-wave velocity, an observed density, and a reservoir distribution range through a logging equipment, and measuring an actual valve of a free-gas saturation, a porosity, and mineral composition ratios of a rock skeleton to validate inversion accuracy; obtaining experienced range values of a free gas saturation, a range of the porosity, and a range of each of the mineral composition ratios; setting the free gas saturation, the porosity, a clay content, a carbonate content, and a water-gas mixture calibration factor as unknown variables with rational variable range to be inverted in the P-wave velocity model and the bulk density model; associating the P-wave velocity model with the observed P-wave velocity data and the bulk density model with the observed density data; and constructing an optimization problem corresponding to multi-dimensional nonlinear with a goal of minimizing a sum of squared errors between model-calculated values and observed values, while setting variable ranges for each inverted unknown variables; after constructing the optimization problem, simultaneously obtaining values of the five reservoir parameters from logging data and initial iteration values, with the initial iteration values randomly selected within the variable ranges; using an interior-point algorithm to iteratively solve the optimization problem, adjusting a consolidation factor of reservoir distribution points during a solution process, and judging inversion accuracy by calculating a root mean square error between the inversion result and the observed reservoir parameters, until obtaining a minimum one; outputting optimal inversion values and consolidation factors for the five reservoir parameters, with the inversion results used to validate inversion accuracy, and the optimal consolidation factor used for predicting a two dimensional (2D) reservoir parameter prediction or a three dimensional (3D) reservoir parameter; during a prediction process of the 2D reservoir parameter prediction or the 3D reservoir parameter, acquiring submarine gas reservoir seismic data collected by a seismic equipment, inverting the submarine gas reservoir seismic data to obtain the 2D P-wave velocity profile or the 3D P-wave velocity profile and a 2D density profile or a 3D density profile; using the optimal consolidation factor, inputting the 2D P-wave velocity profile or 3D P-wave velocity profile, the 2D density profile or the 3D density profile into the optimization problem constructed with the P-wave velocity model and the bulk density model, repeating the inversion process for each seismic common depth point (CDP) trace to invert the five reservoir parameters for each depth point; outputting a 2D reservoir parameter distribution profile or a 3D reservoir parameter distribution profile of the submarine gas reservoir, which is used for reservoir volume evaluation and development optimization.

Furthermore, the mineral composition ratios include a clay bulk modulus $K_{clay}$, and a clay shear modulus $\mu_{clay}$, and a quartz bulk modulus $K_{qua}$, and a quartz shear modulus $\mu_{qua}$, and a carbonate bulk modulus $K_{car}$, and a carbonate shear modulus $\mu_{car}$.

Furthermore, the simplified two-phase Biot equation is as follow:

$$K = K_S(1-\beta_P) + \beta_P^2 K_{av},\ K_{av} = 1/\left(\frac{\beta_P - \phi}{K_S} + \frac{\phi}{K_f}\right),\ \mu = \mu_S(1-\beta_S);$$

K is an overall bulk modulus of a rock, $K_s$ is a bulk modulus of a rock skeleton mineral matrix, $\mu_s$ is a shear modulus of the rock skeleton mineral matrix, $\beta_p$ is a bulk modulus approximate Biot coefficient, $K_{av}$ is an equivalent bulk modulus, $\phi$ is the porosity, Kris a water-gas mixed fluid bulk modulus, $\mu$ is the overall shear modulus of the rock, $\mu_s$ is a shear modulus of the rock skeleton mineral matrix, and $\beta_S$ is a shear modulus approximate Biot coefficient.

Furthermore, the bulk modulus $K_s$ of a rock skeleton mineral matrix and the shear modulus $\mu_s$ of the rock skeleton mineral matrix are calculated by a Hill formula, and the Hill formula is as follow:

$$K_S = \left\{[V_{clay}K_{clay} + (1 - V_{clay} - V_{car})K_{qua} + V_{car}K_{car}] + \frac{1}{[V_{clay}/K_{clay} + (1 - V_{clay} - V_{car})/K_{qua} + V_{car}/K_{car}]}\right\}/2; \text{ and}$$

$$\mu_S = \left\{[V_{clay}\mu_{clay} + (1 - V_{clay} - V_{car})\mu_{qua} + V_{car}\mu_{car}] + \frac{1}{[V_{clay}/\mu_{clay} + (1 - V_{clay} - V_{car})/\mu_{qua} + V_{car}/\mu_{car}]}\right\}/2;$$

$V_{clay}$ is a volume fraction of the clay in the rock skeleton mineral matrix, and $V_{car}$ is a volume fraction of the carbonate in the rock skeleton mineral matrix.

Furthermore, the bulk modulus approximate Biot coefficient Bp and shear modulus approximate Biot coefficient $\beta_S$ are as follow:

$$\beta_P = \frac{\phi(1+\alpha)}{(1+\alpha\phi)}; \beta_S = \frac{\phi(1+\gamma\alpha)}{(1+\gamma\alpha\phi)};$$

where, $$\gamma = \frac{(1+2\alpha)}{(1+\alpha)}, \alpha = \alpha_0\left(\frac{d_0}{d}\right)^{1/3};$$

$\alpha$ is a consolidation factor at a target point, $\alpha_0$ is a consolidation factor at a reservoir bottom, $d_0$ is a depth of reservoir bottom, d is a target depth, and $\phi$ is the porosity.

Furthermore, according to the weighted average equation for mixed fluids, the water-gas mixed fluid bulk modulus Kris expressed as follow:

$$K_f = \chi[(1 - S_g)K_w + S_gK_g] + (1 - \chi)/[(1 - S_g)/K_w + S_g/K_g];$$

where $\chi$ is a water-gas mixture calibration factor, and $0 \le \chi \le 1$, $S_g$ is a free gas saturation, $K_w$ is a bulk modulus of liquid water, and $K_g$ is a bulk modulus of free gas.

Furthermore, the bulk volume equation is as follow:

$$\rho_b = (1-\phi)[V_{clay}\rho_{clay} + (1 - V_{clay} - V_{car})\rho_{qar} + V_{car}\rho_{car}] + (1 - S_g)\phi\rho_w + S_g\phi\rho_g;$$

where, $\rho_b$ is a reservoir bulk density, $V_{clay}$ is a volume fraction of the clay in rock matrix, $V_{car}$ is a volume fraction of the clay in rock matrix, $\rho_{clay}$ is a density of the clay, $\rho_{qar}$ is a density of the quartz, $\rho_{car}$ is a density of the carbonate, $\rho_w$ is a density of the liquid water, and $\mu_g$ is a density of the free gas.

Furthermore, the reservoir P-wave velocity in the P-wave velocity model is as follow:

$$V_P = \sqrt{\frac{K + 4\mu/3}{\rho_b}};$$

where, $V_p$ is a reservoir P-wave velocity, K is the overall bulk modulus of a rock, and $\mu$ is an overall bulk modulus of the rock matrix.

Furthermore, an objective function the optimization problem corresponding to multi-dimensional nonlinear is as follow:

$$\min f(S_g, \phi, V_{clay}, V_{car}, \chi) = [V_p^{obs} - V_p^{mod}(S_g, \phi, V_{clay}, V_{car}, \chi)]^2 + [\rho_b^{obs} - \rho_b^{mod}(S_g, \phi, V_{clay}, V_{car})]^2;$$

where, f is the objective function, $$V_p^{obs}$$

is the observed P-wave velocity, $$V_p^{mod}$$

is a calculated P-wave velocity from the P-wave velocity model, $$\rho_b^{obs}$$

is the observed density, and $$\rho_b^{mod}$$

is a calculated bulk density from the bulk density model.

Furthermore, the variable ranges for each inverted unknown variables are:

$$0 \le S_g \le S_g^{max}, 0 \le V_{clay} \le 1, 0 \le V_{car} \le 1, 0 \le V_{clay} + V_{car} \le 1, 0 \le \chi \le 1;$$

where $$S_g^{max}$$

is a man value of a free gas saturation which always be 0.5.

Furthermore, a variable range of the consolidation factor at the reservoir distribution point is $1 \le a_0 \le 15$.

Furthermore, the five reservoir parameters include the free gas saturation, the porosity, a clay volume fraction, and a carbonate volume fraction from the logging data.

Furthermore, the minimum root mean square error is obtained by calculating the root mean square error between the inversion results and the reservoir parameters; when the root mean square error no longer decreases with a number of iterations and stabilizes within a preset range, convergence is reached, the root mean square error is calculated based on a deviation between the inversion results and the reservoir parameters.

Furthermore, when solving the optimization problem using the interior-point algorithm, multiple sets of initial iteration values are randomly selected within the variable range, and the result with the smallest objective function value is selected as the optimal solution after solving each set.

Furthermore, the step of inverting the submarine gas reservoir seismic data includes: if it is post-stack seismic data, a post-stack seismic inversion method is used to obtain the 2D P-wave velocity profile or the 3D P-wave velocity profile and a 2D density profile or a 3D density profile; and if it is pre-stack seismic data, a amplitude variation with offset inversion method is used to obtain the 2D P-wave velocity profile or the 3D P-wave velocity profile and a 2D density profile or a 3D density profile.

Furthermore, the step of repeating the inversion process includes: repeating the following steps: constructing the P-wave velocity model and the bulk density model based on mineral physical property data; setting the free gas saturation, the porosity, the clay content, the carbonate content, and the water-gas mixture calibration factor as unknown variables to be inverted, and constructing the optimization problem with a goal of minimizing the sum of squares of the model calculation values and profile data; using an interior-point algorithm for iterative solving and outputting the five reservoir parameters for each seismic CDP trace depth point.

Furthermore, the 2D reservoir parameter distribution profile or the 3D reservoir parameter distribution profile includes: spatial distribution information of the free gas saturation, the porosity, the clay content, the carbonate content, and the water-gas mixture calibration factor in the submarine gas reservoir region; the spatial distribution information corresponds one to one with the seismic CDP traces and the depth points.

The present disclosure further provides a device for simultaneous inversion of five reservoir parameters of submarine gas reservoirs using P-wave velocity and density data, including: data acquiring and model constructing module, acquiring an observed P-wave velocity, an observed density, and a reservoir distribution range through a logging equipment, and measuring an actual valve of a free gas saturation, a porosity, and mineral composition ratios of a rock skeleton to validate inversion accuracy; constructing a P-wave velocity model and a bulk density model of the a reservoir rock using a simplified two-phase Biot equation, a weighted average equation of mixed fluid, and a volume density equation; geological experience obtaining and optimization problem constructing module, obtaining experienced range values of a free gas saturation, a range of the porosity, and a range of each of the mineral composition ratios; setting the free gas saturation, the porosity, a clay content, a carbonate content, and a water-gas mixture calibration factor as unknown variables to be inverted in the P-wave velocity model and the bulk density model; associating the P-wave velocity model with the observed P-wave velocity and the bulk density model with the observed density; and constructing an optimization problem corresponding to multi-dimensional nonlinear with a goal of minimizing a sum of squared errors between model-calculated values and observed values, while setting variable ranges for each inverted unknown variables; optimization solution and parameter outputting module, after constructing the optimization problem, simultaneously obtaining values of the five reservoir parameters from logging data and initial iteration values, with the initial iteration values randomly selected within the variable ranges; using an interior-point algorithm to iteratively solve the optimization problem, adjusting a consolidation factor of reservoir distribution points during a solution process, and judging inversion accuracy by calculating a root mean square error between the inversion result and the observed reservoir parameters, until obtaining a minimum root mean square error outputting optimal inversion values and consolidation factors for the five reservoir parameters, with the inversion values used to validate inversion accuracy, and the optimal consolidation factor used for predicting a two dimensional (2D) reservoir parameter prediction or a three dimensional (3D) reservoir parameter; seismic data inversion and reservoir parameters distribution inversion outputting module, during a prediction process of the 2D reservoir parameter prediction or the 3D reservoir parameter, acquiring submarine gas reservoir seismic data collected by a seismic equipment, inverting the submarine gas reservoir seismic data to obtain the 2D P-wave velocity profile or the 3D P-wave velocity profile and a 2D density profile or a 3D density profile; using the optimal consolidation factor, inputting the 2D P-wave velocity profile or 3D P-wave velocity profile, the 2D density profile or the 3D density profile into the optimization problem constructed with the P-wave velocity model and the bulk density model, repeating the inversion process for each seismic common depth point (CDP) trace to invert the five reservoir parameters for each depth point; outputting a 2D reservoir parameter distribution profile or a 3D reservoir parameter distribution profile of the submarine gas reservoir, which is used for reservoir volume evaluation and development optimization.

The present disclosure further provides a system for simultaneous inversion of five reservoir parameters of a submarine gas reservoir using P-wave velocity and density data, including a memory, a processor, and a program for simultaneous inversion of a five reservoir parameters of submarine gas reservoirs using P-wave velocity and density data, wherein the program is executed by the processor to perform steps of the method for simultaneous inversion of five reservoir parameters of the submarine gas reservoirs based on the P-wave velocity and the density mentioned above.

The present disclosure further provides a non-transitory computer-readable storage medium, wherein the non-transitory computer-readable storage medium is configured for storing a program for simultaneous inversion of five reservoir parameters of submarine gas reservoirs using P-wave velocity and density data; when the program is executed by a processor to perform steps of the method for simultaneous inversion of five reservoir parameters of the submarine gas reservoirs based on the P-wave velocity and the density.

In summary, this disclosure includes at least one beneficial technological effect as follows.

By obtaining key data such as observed P-wave velocity, observed density, and rock skeleton mineral composition ratios from a logging equipment, a P-wave velocity model is constructed based on a simplified two-phase Biot equation and a weighted average equation of mixed fluid, avoiding the shortcomings of existing methods that rely on empirical coefficients. A bulk density model is built using a bulk density equation. Combined with geological experience of the five reservoir parameters, five reservoir parameters, including free gas saturation, are set as unknown variables to be inverted. The P-wave velocity model with the observed P-wave velocity and the bulk density model with the observed density are then associated to form a optimization problem corresponding to multi-dimensional nonlinear, solving a pain point of needing pre-known mineral composition or porosity, and laying the foundation for high-precision simultaneous inversion, adaptable to the strong heterogeneity characteristics of reservoir parameters.

Next, the optimization problem is solved iteratively using the interior-point algorithm. By adjusting the consolidation factor of reservoir distribution points and judging root mean square error convergence based on reservoir parameters, inversion accuracy is ensured. Then, using the P-wave velocity and density profiles obtained from seismic data inversion, the optimal consolidation factor is called to repeat the inversion process, generating 2D/3D reservoir parameter distribution profiles. This approach combines the high-precision advantage of well logging with the broad coverage of seismic data, filling the gap in parameter prediction for areas without wells. The final output profile can be directly used for gas reservoir capacity evaluation and development optimization, accurately meeting the practical needs of deepwater natural gas exploration and development.

BRIEF DESCRIPTION OF DRAWINGS

FIG. 1 is a flow chart of a method for simultaneous inversion of five reservoir parameters of submarine gas reservoirs using P-wave velocity and density data.

prediction process at a submarine free gas reservoir bottom boundary depth point using logging data.

Figure 9:
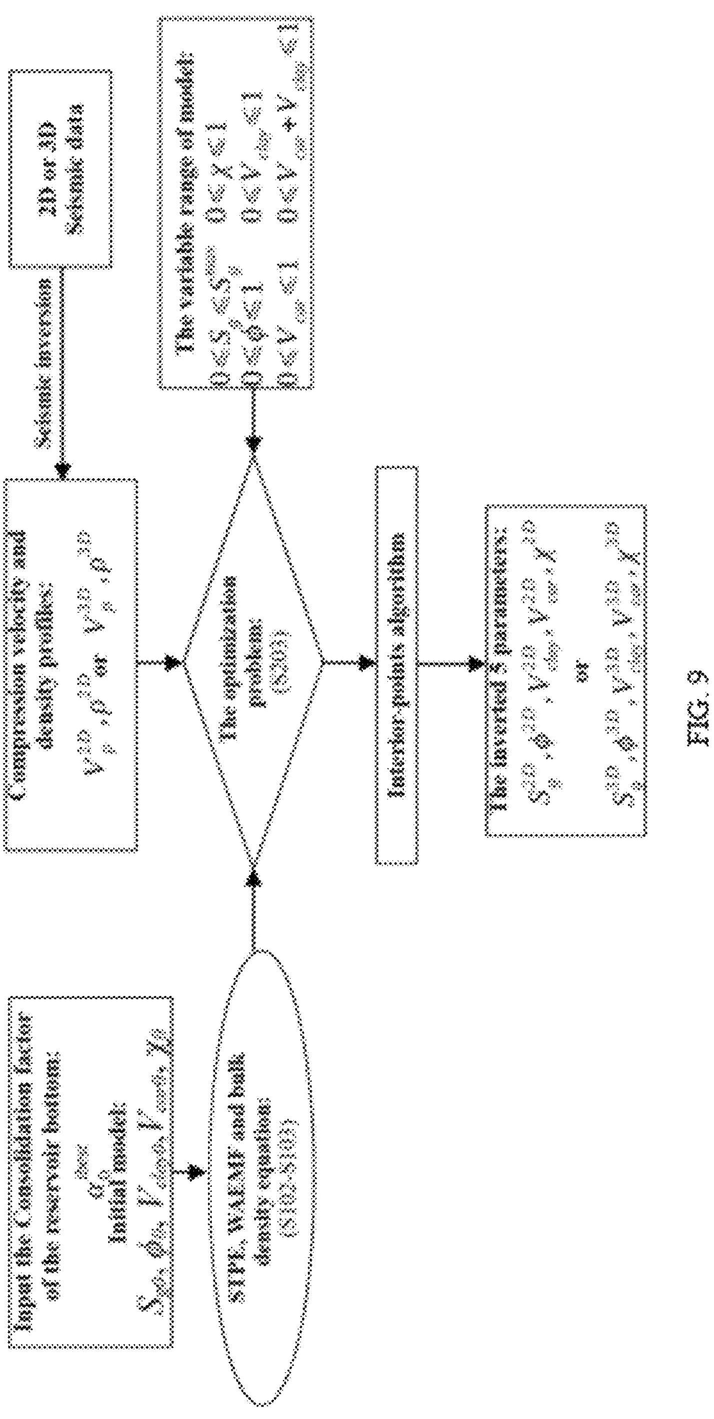

FIG. 9 is a flowchart of the "five-parameter inversion method" to invert reservoir parameter 2D distribution profile and 3D distribution profile from 2D or 3D seismic data.

Figure 10:
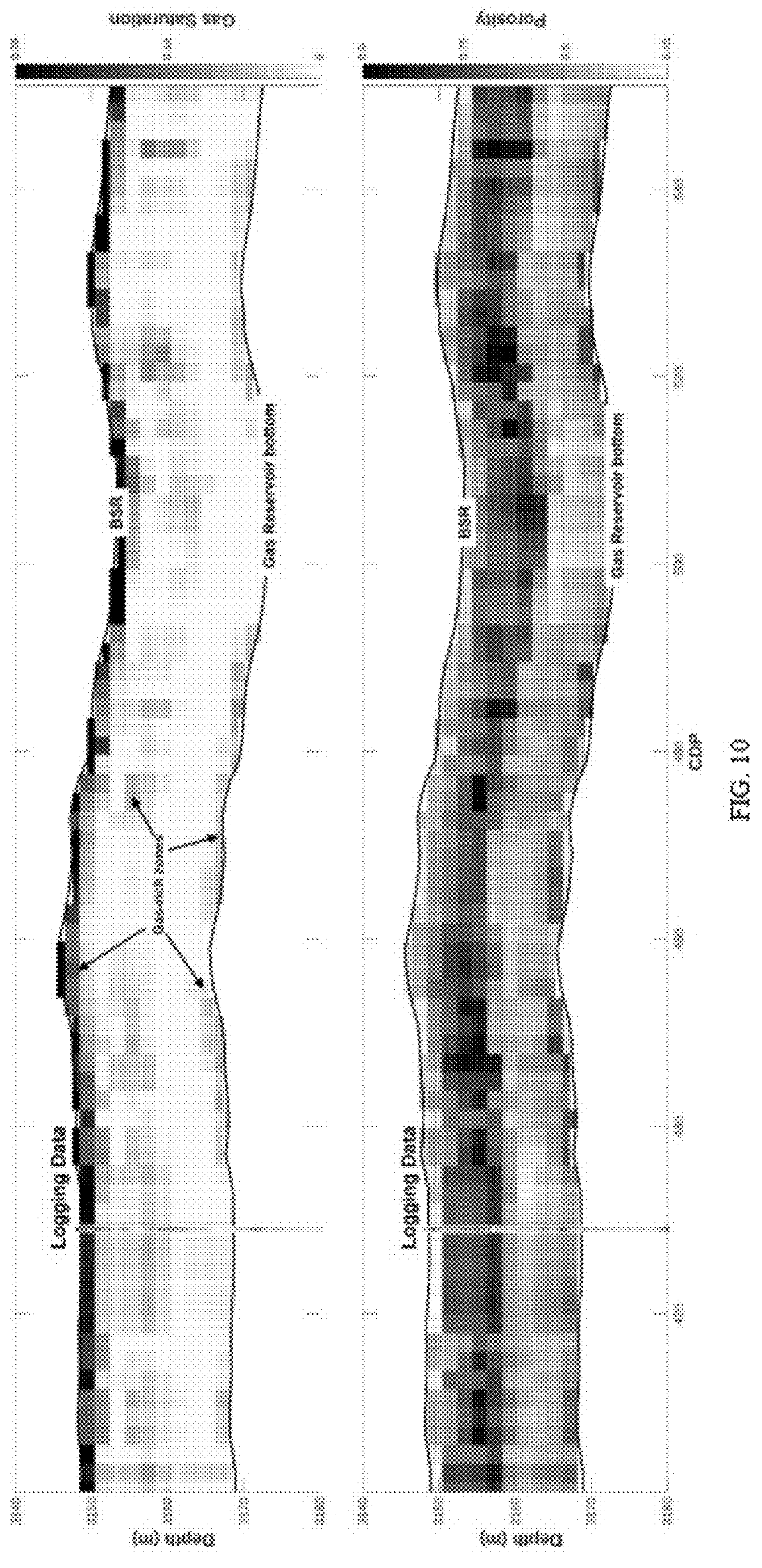

FIG. 10 is a 2D distribution profile of the free gas reservoir parameters inverted from the 2D seismic data using the "five-parameter inversion method".

Figure 11:
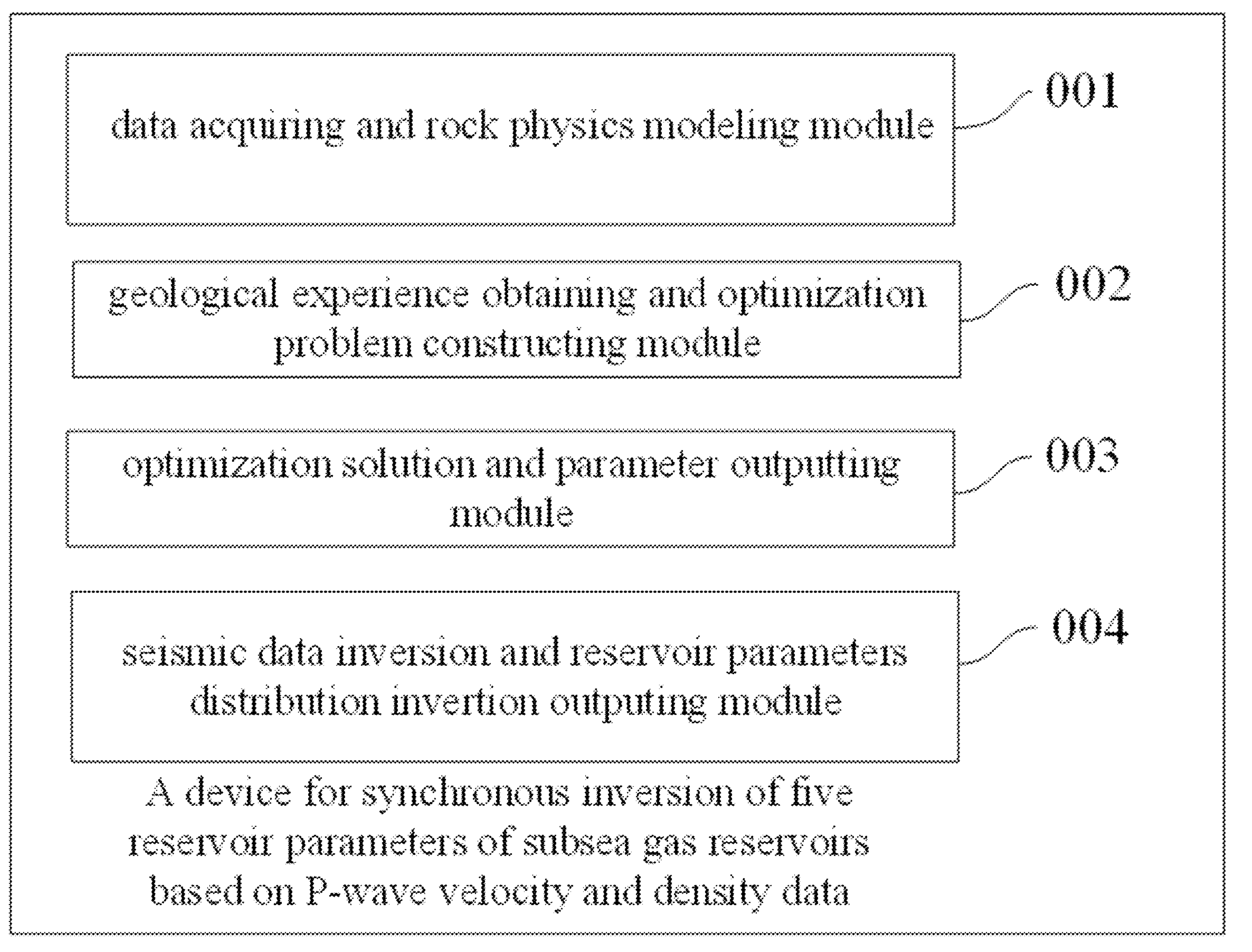

FIG. 11 is a block diagram of a device for simultaneous inversion of five reservoir parameters of submarine gas reservoirs using P-wave velocity and density data.

DETAILED DESCRIPTION OF THE EMBODIMENTS

The following provides a detailed description of the embodiments of this disclosure, with examples of the embodiments shown in the accompanying drawings.

In the description of this specification, reference terms such as "certain embodiments," "one embodiment," "some embodiments," "illustrative embodiments," "examples," "specific examples," or "some examples" refer to specific features, structures, materials, or characteristics described in conjunction with the respective embodiment or example, which are included in at least one embodiment or example of the present application. In this specification, the illustrative expressions of the above terms do not necessarily refer to the same embodiment or example. Moreover, the specific features, structures, materials, or characteristics described can be combined in any suitable manner in one or more embodiments or examples.

Figure 1:
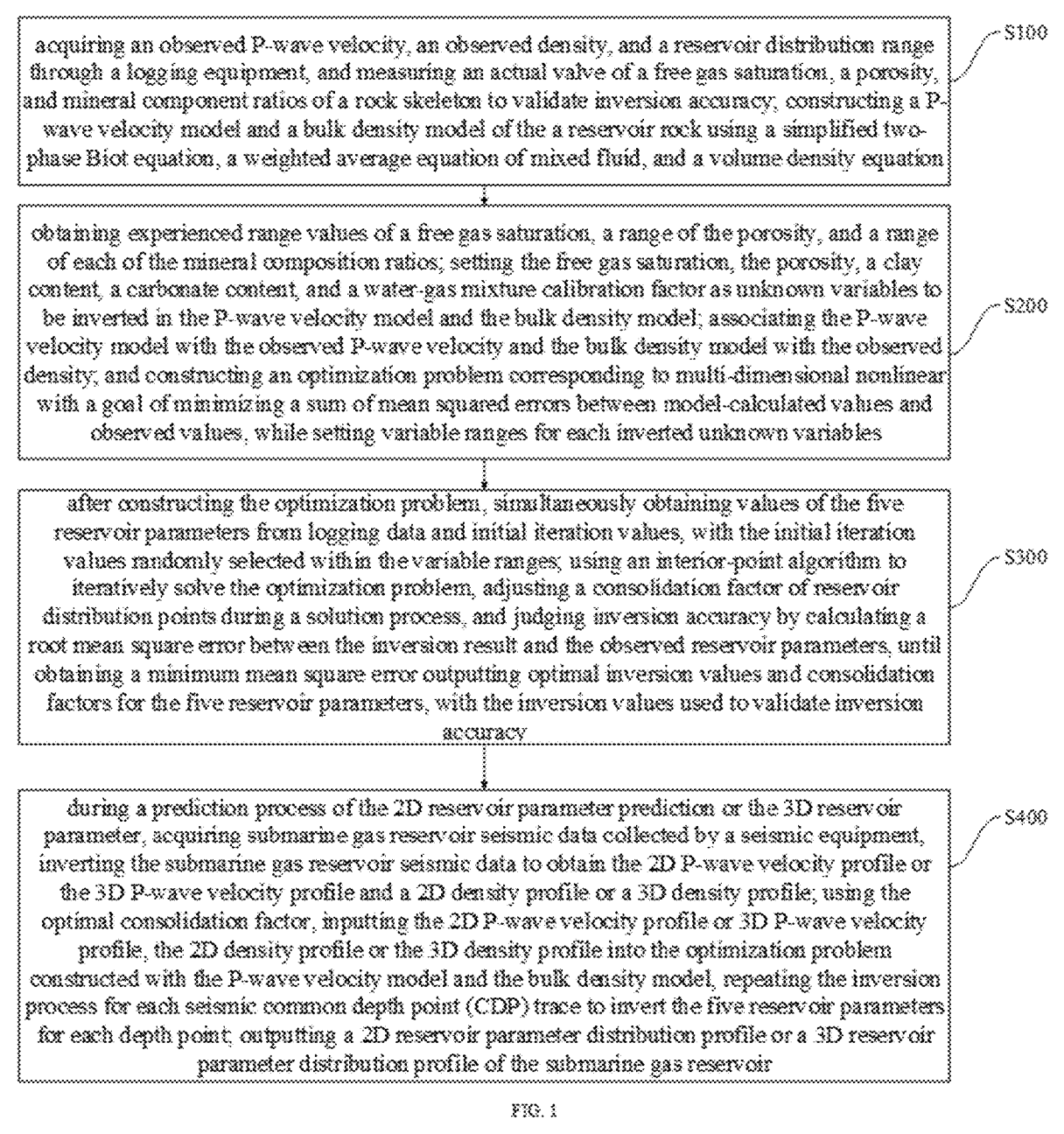

The embodiment of this disclosure discloses a method for simultaneous inversion of five reservoir parameters of submarine gas reservoirs using P-wave velocity and density data, as shown in FIG. 1, including the following steps of S100-S400.

S100, acquiring an observed P-wave velocity, an observed density, and a reservoir distribution range through a logging equipment, and measuring an actual valve of a free gas saturation, a porosity, and mineral composition ratios of a rock skeleton to validate inversion accuracy; constructing a P-wave velocity model and a bulk density model of the a reservoir rock using a simplified two-phase Biot equation, a weighted average equation of mixed fluid, and a volume density equation.

S100 includes the following steps of S101-S103.

S101, acquiring the key data by the logging equipment (such as sonic log, density log, gamma log), which provides input for model construction.

An observed P-wave velocity $$(V_p^{obs}):$$

recording a propagation speed of seismic waves in the reservoir (m/s) by the sonic log, which reflects the comprehensive elastic characteristics of the rock skeleton and fluid. an observed density $$(\rho_b^{obs}):$$

the volume density of the reservoir rock (g/cm$^3$) is observed by the density log, reflecting a mass distribution of the rock skeleton and pore fluid. Gas reservoir bottom depth ($d_0$): a distribution range of the gas reservoir identified using a well logging curve (unit: m), which is used for calculating of a consolidation factor.

Mineral composition ratio data: for main minerals in the rock skeleton (clay, quartz, carbonate), obtain their elastic parameters and density through experiments. For example the values of the bulk modulus, the shear modulus and the density are as follow: clay bulk modulus of 21.0 GPa, clay shear modulus of 7.0 GPa, clay density of 2.60 g/cm$^3$; quartz bulk modulus of 37.0 GPa, quartz shear modulus of 44.0 GPa, quartz density of 2.65 g/cm$^3$; carbonate bulk modulus bulk modulus of 63.7 GPa, carbonate shear modulus of 31.7 GPa, carbonate density of 2.71 g/cm$^3$.

Fluid physical property data: for the fluids in the pores (water, free gas), obtain their bulk modulus and density. For example: water: bulk modulus of 2.36 GPa, density of 1.05 g/cm$^3$; free gas: bulk modulus of $1\times10^{-4}$ GPa, density of $7.8\times10^{-4}$ g/cm$^3$.

S102, the P-wave velocity model $$\left(V_p^{mod}\right)$$

describes the "reservoir parameters→P-wave velocity" mapping relationship and needs to be derived through the following steps.

Calculating a water-gas mixed fluid bulk modulus ($K_f$). Both water and free gas are present in the gas reservoir's pores, and the water-gas mixed fluid bulk modulus may be calculated using the weighted average equation of mixed fluid (WAEMF) (refers to: Yuning Yan, Hongbing Li, Gang Hao et al., Simultaneous inversion of five physical parameters of submarine gas reservoir from synthetic elastic impedance for high-efficiency reserve evaluation, Journal of petroleum exploration and production technology (2025) 15:68 (hereinafter Yan et al. 2025); and Monachesi, Uri Wollner, and Jack Dvorkin; effective pore fluid bulk modulus at patchy saturation an analytic study, journal of geophysical research: solid earth, published online 3 Jan. 2020, 10.1029/2019JB018267 (hereinafter Monachesi et al., 2025)), and the water-gas mixed fluid bulk modulus is as follow:

$$K_f = \chi[(1 - S_g)K_w + S_gK_g] + (1 - \chi)/[(1 - S_g)/K_w + S_g/K_g];$$

where, $K_f$ is water-gas mixed fluid bulk modulus, $\chi$ is a water-gas mixture calibration factor, one of the unknown variables to be inverted, and $0 \le \chi \le 1$ characterize a degree of air-water block distribution, where $\chi=0$ represent uniform mixing of gas and water, $\chi=1$ represent complete separation of gas and water; $S_g$ is a free gas saturation, one of the unknown variables to be inverted, $0 \le S_g \le 0.5$, $K_w$ is a bulk modulus of water; and $K_g$ is a bulk modulus of free gas.

Calculating elastic modulus of the rock skeleton by Hill formula.

The rock skeleton mineral matrix is composed of clay, quartz, and carbonate, and its equivalent bulk modulus ($K_S$) and shear modulus ($\mu_S$) need to be calculated using the Hill formula (refers to: R Hill, the elastic behaviour of a crystalline aggregate, 1952, Proc. Phys. Soc. A 65 349-354, DOI 10.1088/0370-1298/65/5/307 (hereinafter Hill, 1952)), which is as follows:

$$K_S = \left\{[V_{clay}K_{clay} + (1 - V_{clay} - V_{car})K_{qua} + V_{car}K_{car}] + \frac{1}{[V_{clay}/K_{clay} + (1 - V_{clay} - V_{car})/K_{qua} + V_{car}/K_{car}]}\right\}/2; \text{ and}$$

$$\mu_S = \left\{[V_{clay}\mu_{clay} + (1 - V_{clay} - V_{car})\mu_{qua} + V_{car}\mu_{car}] + \frac{1}{[V_{clay}/\mu_{clay} + (1 - V_{clay} - V_{car})/\mu_{qua} + V_{car}/\mu_{car}]}\right\}/2.$$

where, $V_{clay}$ is a volume fraction of the clay in the rock skeleton mineral matrix, and $V_{car}$ is a volume fraction of the carbonate in the rock skeleton mineral matrix. And $K_{clay}$ is a clay bulk modulus, and $\mu_{clay}$ is a clay shear modulus, and $K_{qua}$ is a quartz bulk modulus, and $\mu_{qua}$ is a quartz shear modulus, and $K_{car}$ is a carbonate bulk modulus, and $\mu_{car}$ is a carbonate shear modulus.

Combining the elastic modulus of the rock skeleton and bulk modulus of the pore fluid, the bulk modulus and shear modulus of the rock skeleton as a whole are calculated by the simplified two-phase Biot equation, and the simplified two-phase Biot equation (refers to: Myung Woong Lee, predicting S-wave velocities for unconsolidated sediments at low effective pressure, USGS, published on August 2018 (hereinafter Lee et al., 2018)) is as follow:

$$K = K_S(1 - \beta_P) + \beta_P^2 K_{av},\ K_{av} = 1/\left(\frac{\beta_P - \phi}{K_S} + \frac{\phi}{K_f}\right),\ \mu = \mu_S(1 - \beta_S);$$

where, $$\beta_P = \frac{\phi(1 + \alpha)}{(1 + \alpha\phi)},\ \beta_S = \frac{\phi(1 + \gamma\alpha)}{(1 + \gamma\alpha\phi)},\ \gamma = \frac{(1 + 2\alpha)}{(1 + \alpha)},\ \text{and}\ \alpha = \alpha_0\left(\frac{d_0}{d}\right)^{1/3}.$$

And K is an overall bulk modulus of a rock, $K_s$ is a bulk modulus of a rock skeleton mineral matrix, $\mu_S$ is a shear modulus of the rock skeleton mineral matrix, $\beta_P$ is a bulk modulus approximate Biot coefficient, $K_{av}$ is an equivalent bulk modulus, $\phi$ is the porosity, $K_f$ is a water-gas mixed fluid bulk modulus, $\mu$ is the overall shear modulus of the rock, $\mu_S$ is a shear modulus of the rock skeleton mineral matrix, and $\beta_S$ is a shear modulus approximate Biot coefficient. $\alpha$ is a consolidation factor at a target point, $\alpha_0$ is a consolidation factor at a reservoir distribution point, do is the reservoir distribution range, d is a target depth, and $\phi$ is the porosity. By introducing the consolidation factor to quantify the influence of reservoir depth on rock compaction degree, the problem of deep reservoir modelling errors caused by the neglect of depth effects in traditional Biot equations can be solved. Among them, in the embodiments of the present application, the range of values for the consolidation factor of the reservoir distribution range points is $1 \le \alpha_0 \le 15$.

Based on the overall elastic modulus and bulk density of rocks, calculated the reservoir P-wave velocity:

$$V_P = \sqrt{\frac{K + 4\mu/3}{\rho_b}};$$

where, $V_p$ is a reservoir P-wave velocity, K is the overall bulk modulus of a rock, and $\mu$ is an overall bulk modulus of the rock matrix.

S103, calculating the bulk volume equation by volume weighting the density of the rock skeleton and the pore fluid density, and the bulk volume equation is as follow:

$$\rho_b = (1 - \phi)[V_{clay}\rho_{clay} + (1 - V_{clay} - V_{car})\rho_{qar} + V_{car}\rho_{car}] + (1 - S_g)\phi\rho_w + S_g\phi\rho_g;$$

where, $\rho_b$ is a reservoir bulk density, $V_{clay}$ is a volume fraction of the clay, $\rho_{clay}$ is a density of the clay, $\rho_{qar}$ is a density of the quartz, $\rho_{car}$ is a density of the carbonate, $\rho_w$ is a density of the liquid water, and $\rho_g$ is a density of the free gas.

By directly correlating density with mineral composition and pore fluids, and avoiding the regional limitations of traditional empirical formulas, the physical consistency of the density model is enhanced.

It should be noted that through the execution process of S100—namely, by establishing a quantitative physical mapping between reservoir parameters and geophysical responses, eliminating the reliance on empirical coefficients, providing a benchmark for comparing field data with theoretical models, and integrating multi-source data—the precise characterization of the complex geological features of submarine gas reservoirs has been achieved. This improves the physical reliability and geological adaptability of the inversion method, provides a rigorous theoretical foundation and quantitative comparison for subsequent inversion of the five reservoir parameters, and effectively ensures the accuracy and applicability of the inversion results.

S200, Obtaining a range of free gas saturation, a range of the porosity, and a range of each of the mineral composition ratios; setting the free gas saturation, the porosity, a clay content, a carbonate content, and a water-gas mixture calibration factor as unknown variables to be inverted in the P-wave velocity model and the bulk density model; associating the P-wave velocity model with the observed P-wave velocity and the bulk density model with the observed density; and constructing an optimization problem corresponding to multi-dimensional nonlinear with a goal of minimizing a sum of squared errors between model-calculated values and observed values, while setting variable ranges for each inverted unknown variables.

The specific execution process of S200 includes the following steps of S201-S203.

S201, Setting the variable ranges of the five reservoir parameters.

The variable ranges for the inverted unknown variables need to be obtained based on regional geological experience, logging data statistics, or core experimental analysis. Specifically, the following are included.

The max value of the free gas saturation $$\left(S_g^{max}\right),$$

which is a maximum proportion of free gas in the pore fluid of a gas reservoir $$\left(0 \le S_g \le S_g^{max} \le 1\right),$$

determined by reservoir pressure, temperature conditions, or core experiments (e.g., a deep-sea gas reservoir may have $$S_g^{max} = 0.5,$$

meaning the free gas saturation does not exceed 50%).

A porosity range (0, 1), which is a range of a proportion of pore volume to total volume in the reservoir rock (0≤$\phi$≤1), determined by regional statistics or porosity distribution from well logging curves.

A range of water-gas mixture calibration factor (0≤$\chi$≤1), which is determined by the wave frequency and distribution patchiness of water-gas mixed fluid in rock pore.

A range of each of the mineral composition ratios are as follows.

A clay content ($V_{clay}$): 0≤$V_{clay}$≤1 (e.g., 0.4, meaning clay volume fraction of rock matrix equals to 40%).

A carbonate content ($V_{car}$): 0≤$V_{car}$≤1 (e.g., 0.3, meaning carbonate volume fraction matrix equals to 30%).

A quartz content ($V_{qua}$) is derived from the conservation of total minerals: $V_{qua}=1-V_{clay}-V_{car}$, thus ensuring $V_{clay}+V_{car}\le 1$ (to ensure quartz content is non-negative).

S202: Determining the inverted unknown variables. Clarifying the five key reservoir parameters (the inverted unknown variables) that need to be solved through inversion. These parameters directly affect the P-wave velocity model $$\left(V_p^{mod}\right)$$

and bulk density model $$\left(\rho_b^{mod}\right)$$

constructed by S100. Specifically, the inverted unknown variables are as follows.

The free gas saturation ($S_g$), which is the volume proportion of free gas in the pores, controlling fluid elastic characteristics.

The porosity ($\phi$), which is the proportion of pore volume in the rock skeleton, affecting the contribution weight of the skeleton and fluid.

The clay content ($V_{clay}$), which is the volume fraction of clay minerals in the rock skeleton, affecting skeleton elasticity.

The carbonate content ($V_{car}$), which is the volume fraction of carbonate minerals in the rock skeleton, affecting skeleton elasticity.

The water-gas mixture calibration factor ($\chi$), which used to characterize the uniformity of water-gas distribution in the pore space (0≤$\chi$≤1), controlling the equivalent elastic parameters of the mixed fluid.

These unknown variables to be inverted cover the three core features of the reservoir: "fluid properties-pore structure-skeletal composition." Inversion can fully characterize the physical properties of the gas reservoir.

S203, constructing the optimization problem. The optimization problem is mathematically described as the "deviation between model computed values and observed values," with the objective of "minimizing the deviation" to invert from geophysical responses (P-wave velocity, density) to the five reservoir parameters.

Objective function (deviation quantification), which focuses on the deviations between the computed P-wave velocity models $$\left(V_p^{mod}\right)$$

and observed P-wave velocity models $$\left(V_p^{obs}\right)$$

and the computed bulk density models $$(\rho_b^{mod})$$

and observed bulk density models $$(\rho_b^{obs}).$$

The objective function is formulated as follows:

$$\min f(S_g, \phi, V_{clay}, V_{car}, \chi) = \left[V_p^{obs} - V_p^{mod}(S_g, \phi, V_{clay}, V_{car}, \chi)\right]^2 + \left[\rho_b^{obs} - \rho_b^{mod}(S_g, \phi, V_{clay}, V_{car})\right]^2;$$

where, $\rho_b$ is a reservoir bulk density, $V_{clay}$ is a volume fraction of the clay, $\rho_{clay}$ is a density of the clay, $\rho_{qar}$ is a density of the quartz, $\rho_{car}$ is a density of the carbonate, $\rho_w$ is a density of the liquid water, and $\rho_g$ is a density of the free gas.

It should be noted that the smaller the value of the objective function, the closer the model calculation results are to the observed data, and the corresponding unknown variables to be inverted are closer to the actual reservoir parameters. Since the P-wave velocity model $$(V_p^{mod})$$

and bulk density model $$(\rho_b^{mod})$$

in S100 involve nonlinear operations such as multiplication and square root (coupling nonlinear impacts of the five parameters on the objective function), the objective function f is a multidimensional nonlinear function of the five parameters. Therefore, this problem is a multidimensional nonlinear constrained optimization problem.

The variable range for each unknown variables to be inverted (inequality constraints) is set to ensure that the inversion results comply with geological physical laws, as follows: the variable range for each inverted unknown variable is:

$$0 \le S_g \le S_g^{max},$$

$0 \le V_{clay} \le 1$, $0 \le V_{car} \le 1$, $0 \le V_{clay} + V_{car} \le 1$, $0 \le \chi \le 1$; where $$S_g^{max}$$

is set to 0.5 according to geological experience. The role of constraints is to: exclude physically impossible solutions (e.g., negative porosity or mineral content exceeding 100%); narrow the solution space, reduce inversion computation, and avoid falling into meaningless local minima; incorporate geological prior knowledge (e.g., maximum gas saturation in regional gas reservoirs) to enhance the geological credibility of the inversion results.

By constructing a multidimensional nonlinear optimization problem with the objective of minimizing the sum of squared deviations between the model calculated values and observed values, S200 clarifies the five unknown variables to be inverted. This not only transforms the forward problem ("reservoir parameters→geophysical response") into the inverse problem ("geophysical response→reservoir parameters") into a mathematically solvable framework, but also avoids physical anomalous solutions through constraints, focuses on key parameters to reduce inversion non-uniqueness, and provides a clear convergence criterion for subsequent iterations with the quantified deviation target. Ultimately, it builds a rigorous bridge between the theoretical model and actual parameters for reservoir parameter inversion, ensuring the rationality of the inversion process and the reliability of the results.

S300, after constructing the optimization problem, simultaneously obtaining values of the five reservoir parameters from logging data and initial iteration values, with the initial iteration values randomly selected within the variable range corresponding to the geological experience; when solving the optimization problem using the interior-point algorithm, multiple sets of initial iteration values are randomly selected within the variable range corresponding to geological experience; using an interior-point algorithm (Richard H. Byrd, Mary E. Hribar, and Jorge Nocedal, an interior point algorithm for large-scale nonlinear proprogramming, 1999 society for industrial and applied mathematics, volume 9, No. 4, pages 877-900, hereinafter Byrd et al., 1999) to iteratively solve the optimization problem, adjusting a consolidation factor of reservoir distribution points during a solution process, and judging inversion accuracy by calculating an error between the inversion result and the observed reservoir parameters; the error is calculated based on a root mean square error between the inversion results and the reservoir parameters, for example, the root mean square error between the inverted free gas saturation and the observed free gas saturation, the root mean square error between the inverted porosity and the observed porosity; when the root mean square errors no longer decreases with a number of iterations and stabilizes within a preset range, convergence is reached, at this point, error minimization is achieved; outputting optimal inversion values and consolidation factors for the five reservoir parameters, with the inversion values used to validate inversion accuracy, and the optimal consolidation factor used for predicting a two dimensional (2D) reservoir parameter prediction or a three dimensional (3D) reservoir parameter.

It should be note that when using the interior-point algorithm for iterative solving of the optimization problem, multiple sets of initial iteration values are randomly selected within the variable range. After solving each set, the result with the minimum objective function value is chosen as the optimal solution.

It should also be noted that S300 solves the multidimensional nonlinear constrained optimization problem constructed by S200 using the interior-point algorithm. By combining the reservoir parameters to determine the convergence state, S300 ultimately obtains the inversion values for five reservoir parameters and the optimal consolidation factor that align with geological reality. This approach addresses the issues of "how to efficiently search for the optimum" and "how to ensure result reliability" during the inversion process, providing computational support for the quantification of reservoir parameters.

The specific execution process of S300 includes the following steps of S301-S303:

S301, defining the three key inputs clearly, which serve as the foundation for the inversion solution.

Optimization problem, directly call the multi-dimensional nonlinear constrained optimization problem constructed by S200, including the objective function (minimizing the sum of squared errors between model-calculated values and observed values) and the reservoir parameter variable range; the objective function formula is as follows:

$$\min f(S_g, \phi, V_{clay}, V_{car}, \chi) = \left[V_p^{obs} - V_p^{mod}(S_g, \phi, V_{clay}, V_{car}, \chi)\right]^2 + \left[\rho_b^{obs} - \rho_b^{mod}(S_g, \phi, V_{clay}, V_{car})\right]^2.$$

Reservoir parameters: extracting known reference values from logging data (such as porosity from core analysis, free gas saturation from well testing, etc.), which are used to determine the root mean square error of the inversion results. These reference values correspond one-to-one with the inversion unknown variables (free gas saturation, porosity, clay content, carbonate content, water-gas mixture calibration factor) and form a reference vector, which serves as the "true value" for error evaluation.

Initial iteration values: selecting initial solutions randomly within the reservoir parameter variable range defined by S200 (e.g., free gas saturation ranging from 0 to 0.5, porosity between its minimum and maximum values, etc.), ensuring the initial values are geophysical reasonable and providing a starting point for iterative solving.

S302, iterative solving of the optimization problem using the interior-point algorithm.

The interior-point algorithm is applied to iteratively solve the optimization problem constructed by S200. The core of this process is to continuously approach the optimal solution through mathematical iteration. The specific operation focuses on the two following key aspects.

Iteration solving process: using the interior-point algorithm as a computational tool, the iteration begins with the initial values, and through the algorithm, the inversion unknown variable (such as free gas saturation, porosity, etc.) are adjusted to reduce the objective function value (the sum of squared errors between model-calculated values and observed values) gradually, until it approaches the minimum value.

Consolidation factor adjustment: during the iteration, the consolidation factor at reservoir distribution points (a parameter used in S100 to describe the degree of rock compaction) is simultaneously adjusted. By dynamically adjusting this coefficient, the calculation accuracy of the reservoir parameters (e.g. gas saturation, porosity and mineral constituent ratio) are optimized, ensuring the model better matches the observed data at different depths.

S303, convergence judgment and result output. The iteration process is terminated according to a clear convergence criterion, and the core results are outputted:

Convergence judgment: by calculating the error between each iteration result and the reservoir parameters (such as the deviation of each parameter's inversion value from the corresponding reference value), it is determined whether the iteration has converged. When the error decreases to the preset minimum threshold (i.e., error minimization), or the error no longer changes significantly, convergence is judged, and the calculation is stopped.

Results output and usage, which includes the inversion values of the five reservoir parameters. These include the optimal solutions for free gas saturation, porosity, clay content, carbonate content, and water-gas mixture calibration factor, which can be verified by comparing with core experiment and well testing data.

Figure 2:
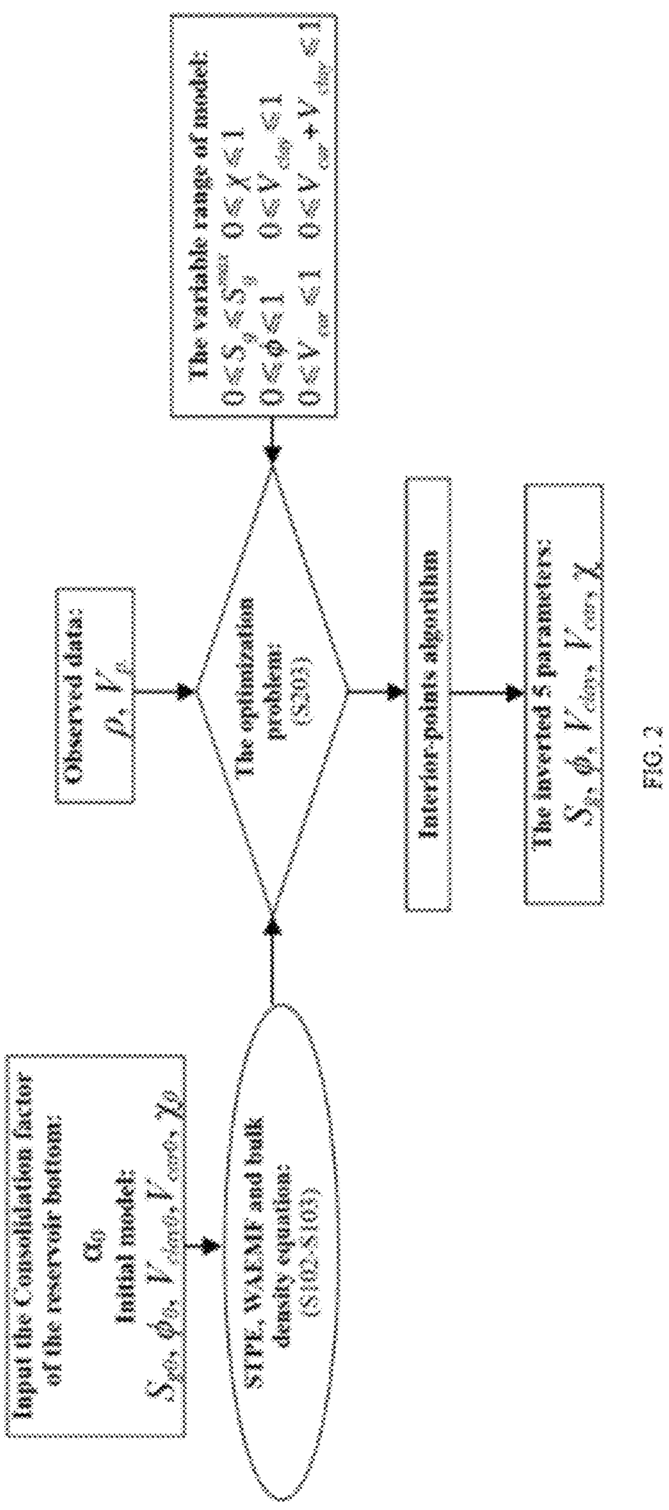
FIG. 2 is a flow chart for simultaneous inversion algorithm of the five reservoir parameters of a single-well submarine free gas reservoir.

Optimal consolidation factor: the consolidation factor value that best matches the model with the observed data during the iteration process. This value is used for subsequent 2D/3D reservoir parameter prediction, eliminating the influence of depth differences on reservoir characterization (as shown in FIG. 2).

By applying the interior-point algorithm to iteratively solve the optimization problem, combining reservoir parameters to judge the convergence state, and dynamically adjusting the consolidation factor, the final inversion values of the five reservoir parameters validate the inversion accuracy. The optimal consolidation factor provides key support for subsequent 2D/3D reservoir parameter prediction, achieving the conversion from the mathematical model to quantitative reservoir parameters, ensuring the reliability and geological rationality of the inversion results. It also bridges the single-well inversion and regional-scale prediction, laying a precise parameter foundation for gas reservoir reserve evaluation and development optimization.

In this embodiment, the core logic of the method for inversing the five reservoir parameters of submarine gas reservoirs based on simultaneous inversion of P-wave velocity and density (including the construction of physical models, optimization problem design, interior-point algorithm solution, and output of optimal consolidation factor) has been detailed earlier. To further verify the inversion accuracy, parameter settings, and engineering applicability of this method under actual geological conditions, inversion tests were conducted with multiple publicly available well logging sites (including international ocean discovery program (IODP) and special exploration sites) to quantify the method's reliability. At the same time, by connecting the "single-well logging verification→2D/3D seismic profile inversion process," this provides the observed support for the later "seismic data inversion and reservoir parameter inversion distribution output," ensuring the integrity of the technical solution from "single-point theoretical verification" to "regional engineering application."

The following are the specific inversion effect verification details: In this embodiment, during the inversion, the main rock physical parameters and the variable ranges of the five parameters are as shown in Tables 1 and 2.

TABLE 1

Sedimentary layer composition physical parameters (refers to: Lee 2008, and Riedel, M., Collett, T. S., Malone, M. J., the expedition 311 scientists proceedings of the integrated ocean drilling program, volume 311, site U1329, 2006 (hereinafter Collett et al., 2006); and Rafael Amaral Cataldo, Impact of mineralogy on rock physics modeling: a Brazilian pre-salt case study, Emilson Pereira Leite, 2022, (hereinafter Cataldo, 2022))

| Material | Bulk modulus (GPa) | Shear modulus (GPa) | Density (g/cm$^3$) |
|---|---|---|---|
| Clay | 21 | 7 | 2.7 |
| Quartz | 38 | 44 | 2.65 |
| Carbonate | 63.7 | 31.7 | 2.88 |
| Sea water | 2.36 | 0 | 1.05 |
| Natural gas | $1.0{*}10^{-4}$ | 0 | $7.8{*}10^{-4}$ |

TABLE 2

| variable range of the inversion variable | | | | | |
|---|---|---|---|---|---|
| Five reservoir parameters | $S_g$ | $\phi$ | $V_{clay}$ | $V_{car}$ | $\chi$ |
| Range of variation | [0, 0.5] | [0, 1] | [0, 1] | [0, 1] | [0, 1] |

Figure 3:
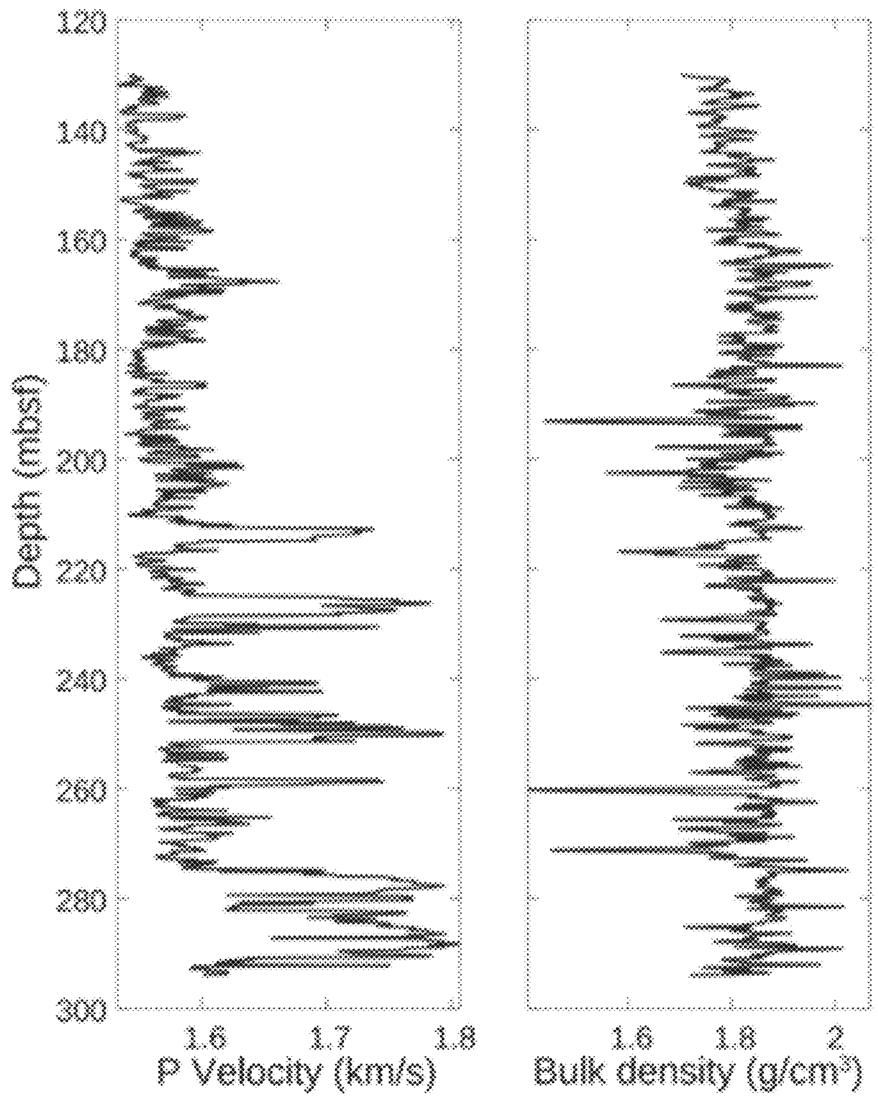
FIG. 3 is a schematic diagram of P-wave velocity and bulk density of Hole 1245E.

In the "five-parameter inversion test" using well logging data (P-wave velocity, density), the initial model for the five parameters was set to [0, 0, 0, 0, 0], with the value of do set to 4. Other rock physical parameters were set as in Table 1, and the results from Lee et al. (2006) were used for comparison. The well logging data is shown in FIG. 3.

Figure 4:
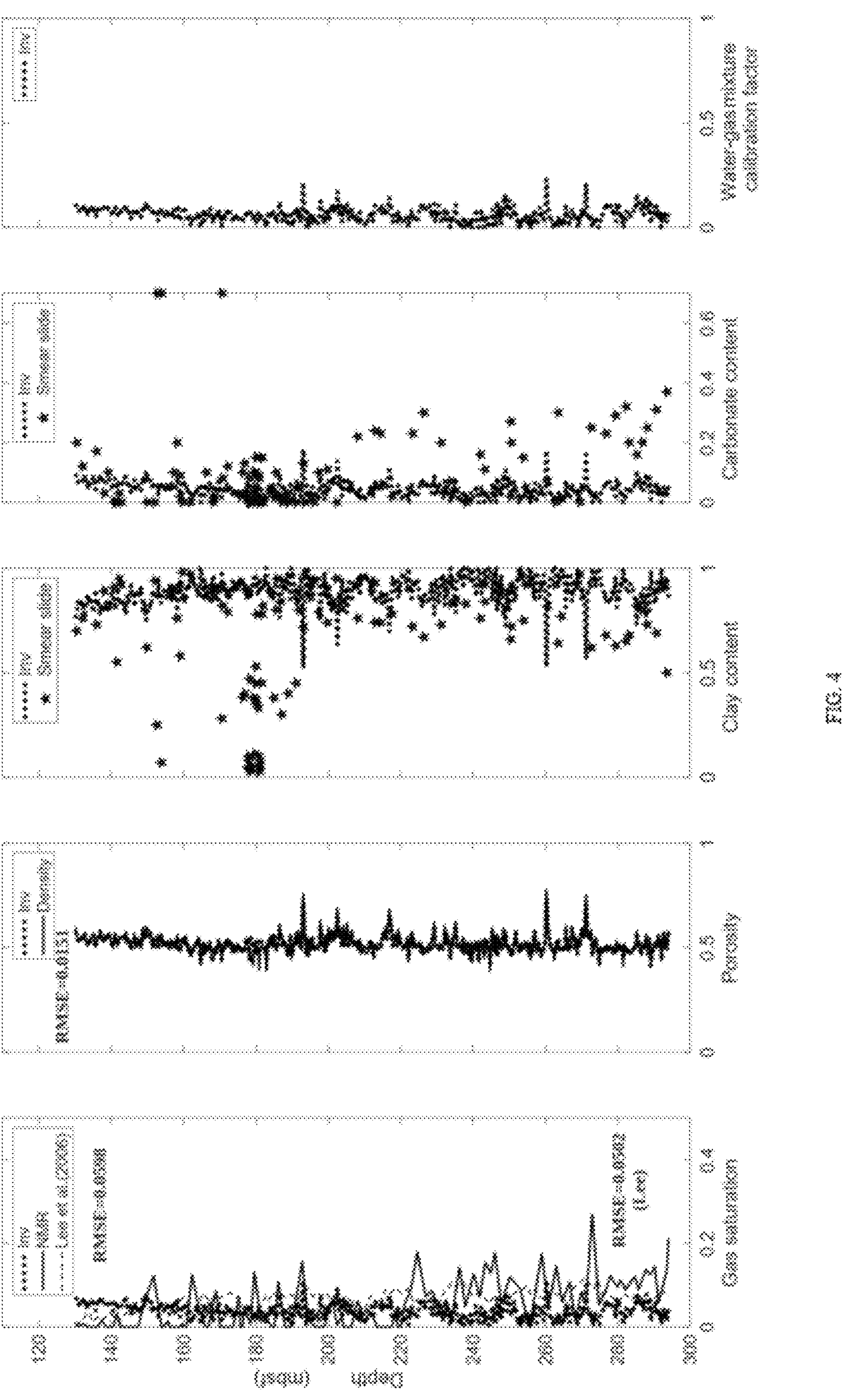
FIG. 4 is a schematic diagram of the five reservoir parameters inverted from data of the Hole 1245E.

As shown in FIG. 4, FIG. 4 is a schematic diagram of the five reservoir parameters inverted from data of the Hole 1245E (M. W. Lee and T. S. Collett, gas hydrate and free gas saturations estimated from velocity logs on hydrate ridge, off shore oregon, USA proceedings of the ocean drilling program, scientific results, volume 204, web publication: 13 Jan. 2006, (hereinafter Lee and Collett, 2006); and Tréhu, A. M., Bohrmann, G., Rack, F. R., Torres, M. E., et al., 2003 proceedings of the ocean drilling program, initial reports, volume 204, site 1245 (hereinafter Tréhu et al., 2003)). In this figure, (a) Free gas saturation; (b) Porosity; (c) Clay content; (d) Carbonate content; (e) water-gas mixture calibration factor. The gray-marked depth intervals represent areas with thin layers of high carbonate content, while the other represents areas with thin layers of high quartz (volcanic glass) content. Although the root mean square error of the free gas saturation inversion result (0.0598) is slightly higher than the univariate inversion method based on the BGTL-Brie equation proposed by Lee and Collett, 2006, (0.0502), it still accurately synchronizes the inversion of porosity and mineral composition proportions. Several thin layers with high quartz and carbonate content have low thickness (~1 m), which cannot be distinguished in P-wave velocity and density logging, making inversion difficult.

Figure 5:
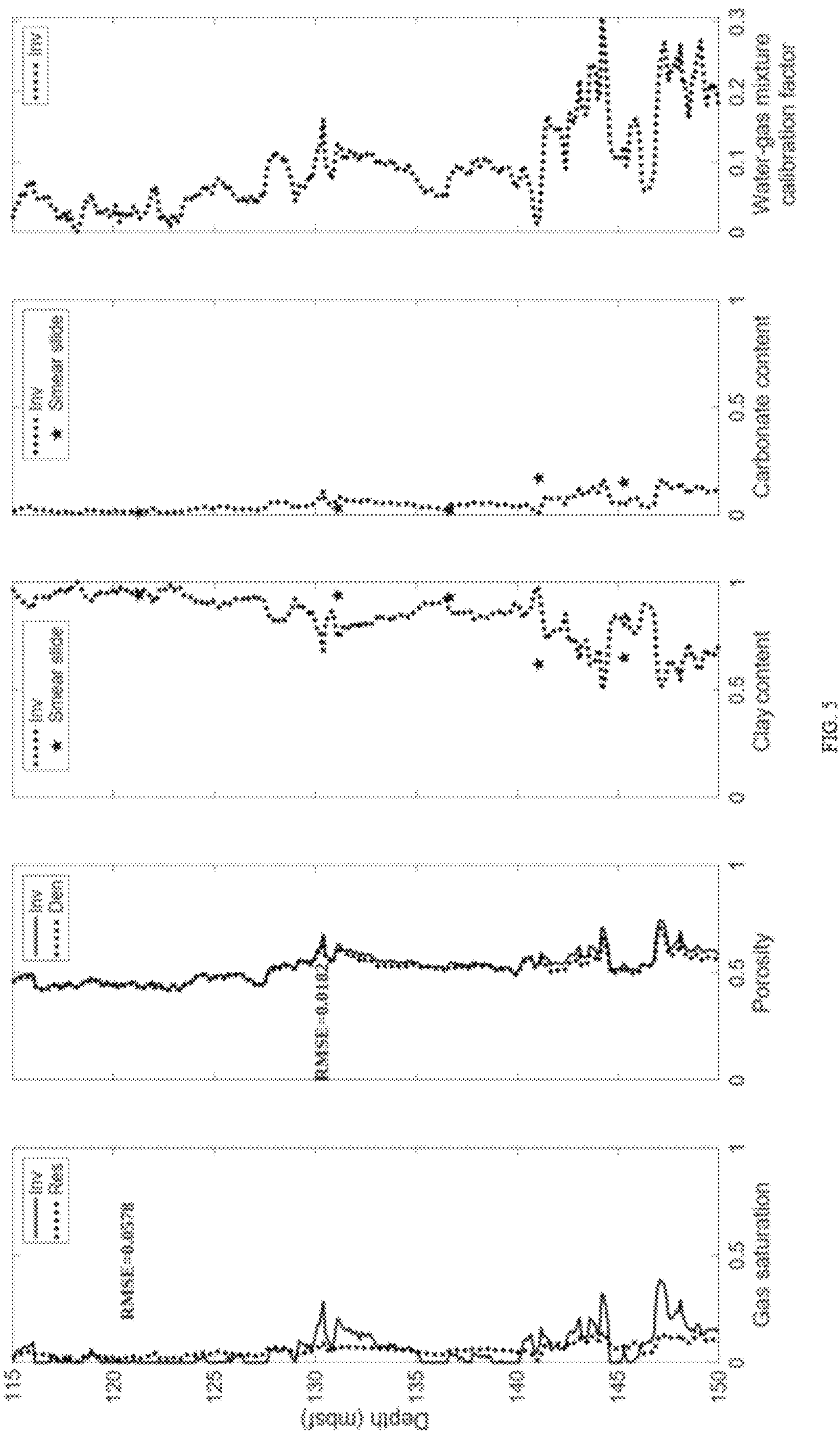
FIG. 5 is a schematic diagram of the five reservoir parameters inverted from data of the Hole NGHP-01-14A.

When using the well logging data from Hole NGHP-01-14A (Krishna-Godavari Basin) (T. Collett, M. Riedel, J. Cochran, R. Boswell, J. Presley, P. Kumar, A. Sathe, A. Sethi, M. Lall, the national gas hydrate program expedition 01 scientists, 2015, sites NGHP-01-14 (hereinafter Collett et al., 2015)) for the "five-parameter inversion test," the parameter do is set to 5, parameter $\rho_{clay}$ is set to 2.73, and $K_{car}$ is set to 74.9 GPa and $\mu_{car}$ is set to 49.8 GPa. The other rock physical parameters were set as in Table 1. The inversion results are shown in FIG. 5. The inversion results for free gas saturation, porosity, and mineral composition proportions match well with the well logging data. It should be noted that in FIG. 5, (a) Free gas saturation; (b) Porosity; (c) Clay content; (d) Carbonate content; (e) water-gas mixture calibration factor.

Figure 6:
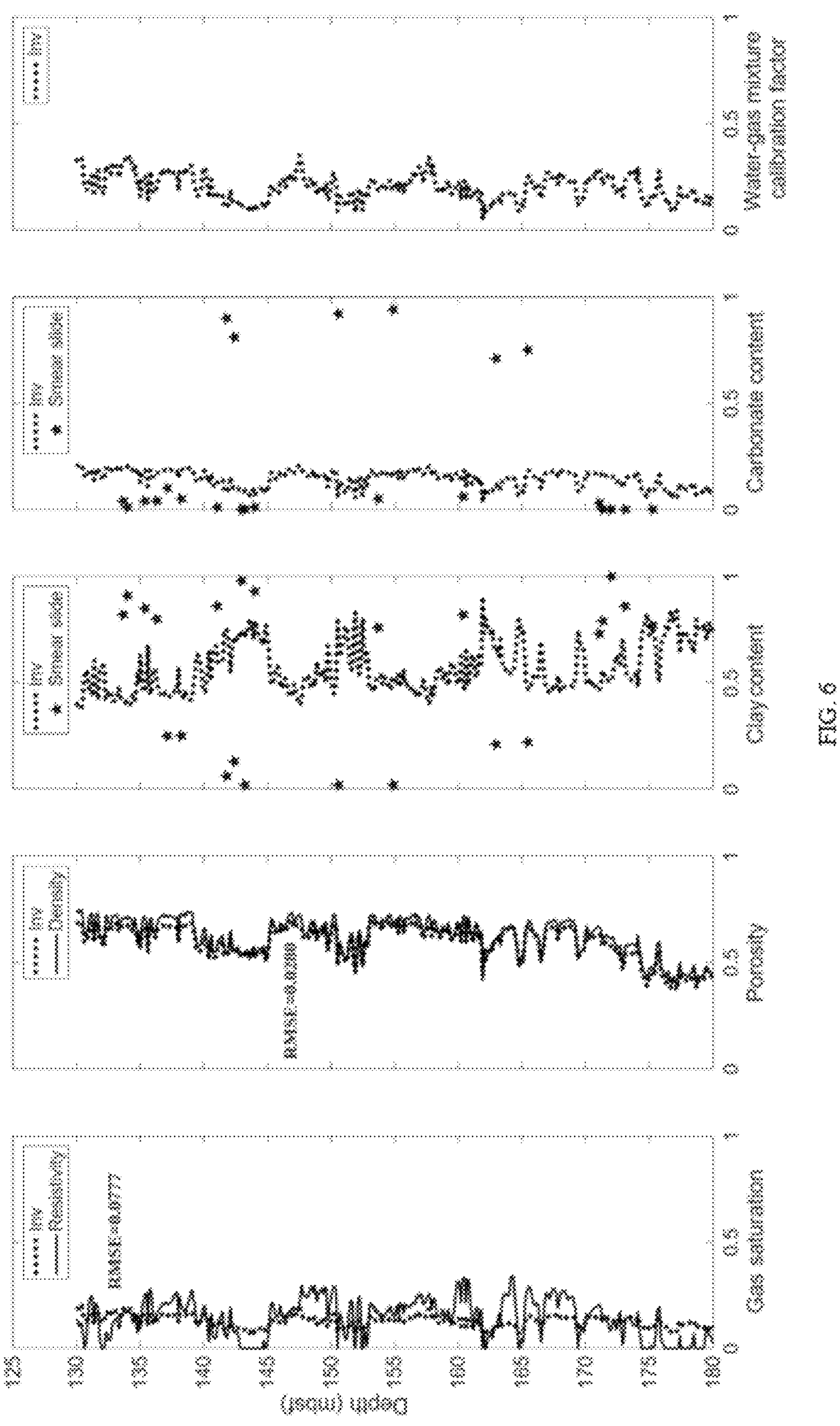
FIG. 6 is a schematic diagram of the five reservoir parameters inverted from data of the Hole U1329D.

When using the well logging data from Hole U1329D (Cascadia Margin) (Collett et al., 2006) for the "five-parameter inversion test," the parameter $\alpha_0$ is set to 5, parameter $\rho_{clay}$ is set to 2.73, and $K_{car}$ is set to 74.9 GPa, and $\mu_{car}$ is set to 49.8 GPa. The other rock physical parameters were set as in Table 1. The inversion results are shown in FIG. 6. The inversion results for free gas saturation and porosity fit well with the well logging data, but the inversion results for mineral composition proportions are slightly higher due to the local thin layers with high quartz and carbonate content, which have thicknesses lower than the resolution of P-wave velocity and density logging data. It should be noted that in FIG. 6, (a) free gas saturation; (b) porosity; (c) clay content; (d) carbonate content; (e) water-gas mixture calibration factor.

Figure 7:
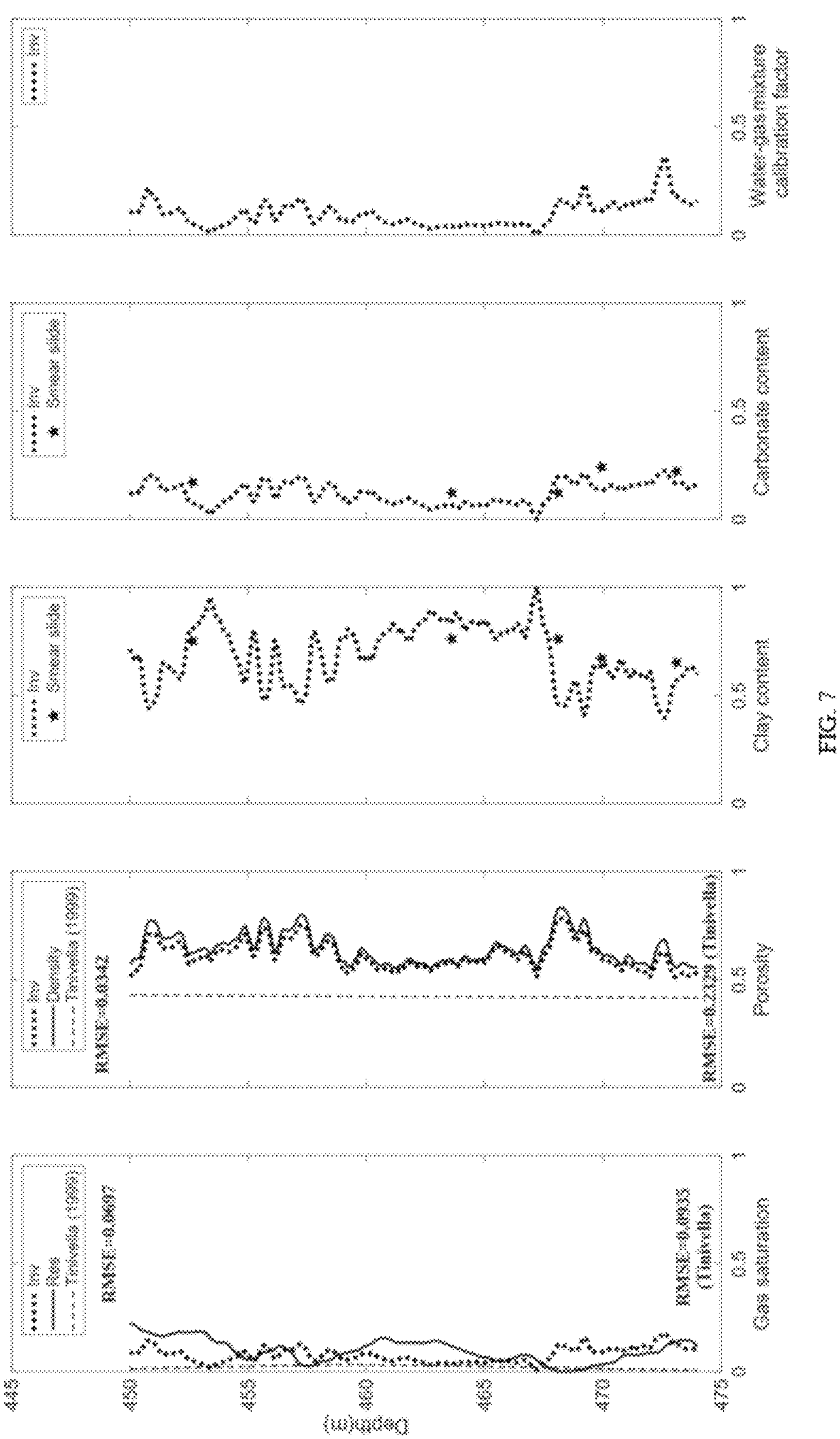
FIG. 7 is a schematic diagram of the five reservoir parameters inverted from data of the Hole 997B.

When using the well logging data from Hole 997B (Blake Ridge) (Paull, C. K., Matsumoto, R., Wallace, P. J., et al, 1996 proceedings of the ocean drilling program, initial reports, volumn. 164, site 997, (hereinafter Paull et al., 1996)) for the "five-parameter inversion test," the parameter $\alpha_0$ is set to 8, parameter $\rho_{clay}$ is set to 2.58, and the other rock physical parameters were set as in Table 1. The inversion results are shown in FIG. 7. The inversion results for free gas saturation, porosity, and mineral composition proportions match well with the well logging data. It should be noted that in FIG. 7, (a) free gas saturation; (b) porosity; (c) clay content; (d) carbonate content; (e) water-gas mixture calibration factor.

Based on the above process, single-well inversion tests at multiple publicly available well locations (Hole 1245E, NGHP-01-14A, etc.) have confirmed the accuracy of the "five-parameter inversion method" for predicting point reservoir parameters (such as free gas saturation, porosity, etc.).

S400, during a prediction process of the 2D reservoir parameter prediction or the 3D reservoir parameter, acquiring submarine gas reservoir seismic data collected by a seismic equipment, inverting the submarine gas reservoir seismic data to obtain the 2D P-wave velocity profile or the 3D P-wave velocity profile and a 2D density profile or a 3D density profile; using the optimal consolidation factor, inputting the 2D P-wave velocity profile or 3D P-wave velocity profile, the 2D density profile or the 3D density profile into the optimization problem constructed with the P-wave velocity model and the bulk density model, repeating the inversion process for each seismic common depth point (CDP) trace to invert the five reservoir parameters for each depth point: repeating the following steps: constructing the P-wave velocity model and the bulk density model based on mineral physical property data; setting the free gas saturation, the porosity, the clay content, the carbonate content, and the water-gas mixture calibration factor as unknown variables to be inverted, and constructing the optimization problem with a goal of minimizing the sum of squares of the model calculation values and profile data; using an interior-point algorithm for iterative solving and outputting the five reservoir parameters for each seismic CDP trace depth point; outputting a 2D reservoir parameter distribution profile or a 3D reservoir parameter distribution profile of the submarine gas reservoir, which is used for reservoir volume evaluation and development optimization. The 2D reservoir parameter distribution profile or the 3D reservoir parameter distribution profile includes: spatial distribution information of the free gas saturation, the porosity, the clay content, the carbonate content, and the water-gas mixture calibration factor in the submarine gas reservoir region; the spatial distribution information corresponds one to one with the seismic CDP traces and the depth points.

It should be noted that, based on seismic data and the optimal consolidation factor output by S300, the inversion of reservoir parameters at the single well scale is expanded to the 2D/3D regional scale. This approach systematically characterizes the spatial distribution of reservoir parameters across the entire gas reservoir, providing quantitative spatial distribution references for precise gas reservoir volume estimation and development scheme optimization.

The specific execution process of S400 includes the following steps of S401-S03.

S401, obtaining seismic data and inversion to obtain P-wave velocity and density profiles.

The seismic reflection data of the submarine gas reservoir are acquired using seismic exploration equipment (e.g., towed cable seismometers, submarine seismometers). The data records the reflection signals of seismic waves at various interfaces between underground rock layers, covering both the horizontal and vertical ranges of the gas reservoir region (2D or 3D coverage).

Seismic data inversion processing: after performing conventional processing (e.g., noise removal, stacking, migration) on the raw seismic data, seismic inversion is executed. This converts seismic amplitudes and other responses into geophysical parameter profiles with physical dimensions. The final result is 2D/3D P-wave velocity profile and 2D/3D density profile. Taking plane coordinates (x, y) and depth (z) as dimensions, representing the distribution of P-wave velocity $V_p$ in the gas reservoir region at different locations and depths, with units in m/s. The 2D/3D density profile corresponds to the spatial range of the P-wave velocity profile, representing the distribution of bulk density p, at different locations and depths, with units in kg/m$^3$.

S402, repeating the inversion process to calculate the five reservoir parameters by invoking the optimal consolidation factor.

Integrating the core input. The optimal consolidation factor output by invoking S300. The optimal consolidation factor, optimized through single-well data, can uniformly correct the compaction effects of reservoirs at different depths, ensuring vertical consistency in the regional inversion model. The 2D/3D P-wave velocity profile (replacing the single well) and the 2D/3D density profile (replacing the single well) from S401 are used as the geophysical response input for regional inversion.

Regional inversion and calculation: the seismic CDP (common depth point) traces are used as the basic calculation unit. Each CDP trace corresponds to a vertical depth sequence at a specific horizontal position in the subsurface (i.e., "each depth point"). Inversion is performed on each trace and depth point to achieve full regional coverage.

Repeating the inversion process: for each depth point of each CDP trace, the inversion logic from S200-S300 is strictly repeated.

Constructing the optimization problem. Constructing the objective function (same as S200):

$$\min f(S_g, \phi, V_{clay}, V_{car}, \chi) = \left[V_p^{obs} - V_p^{mod}(S_g, \phi, V_{clay}, V_{car}, \chi)\right]^2 + \left[\rho_b^{obs} - \rho_b^{mod}(S_g, \phi, V_{clay}, V_{car})\right]^2$$

where, the observed P-wave velocity $$V_p^{obs}$$

and the observed density $$\rho_b^{obs}$$

are the P-wave velocity and density data at the current depth point of the CDP trace replace the corresponding variables.

To further validate the applicability of this method for extending from "single-well local data" to "regional large-scale data" and realizing the quantitative characterization of 2D submarine gas reservoir parameter distribution, this disclosure proposes the following processes to achieve this goal.

Figure 8:
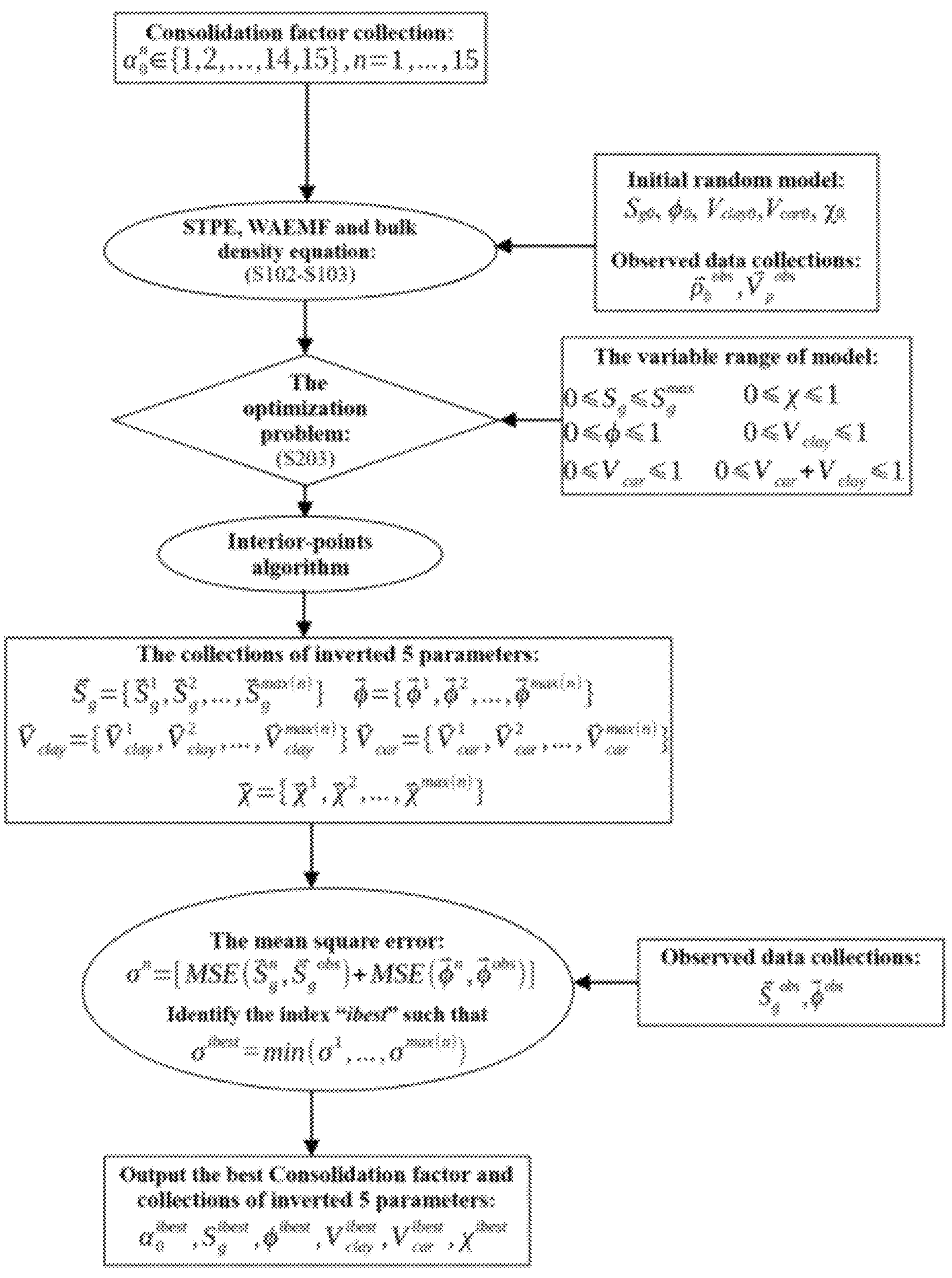
FIG. 8 is a flowchart of a consolidation factor $$(\alpha_0^{ibest})$$

The program first calculates a sum of mean squared errors o" (between the inversion results of "free gas saturation"

$$(S_g^n)$$

and "porosity" ($\phi^n$) for different values of the consolidation factor $$\alpha_0^n$$

at various reservoir distribution points within the variable range, and the logging data $$(S_g^{obs}, \phi^{obs}),$$

and finds the value of $$\alpha_0^{ibest}$$

that minimizes the sun of mean squared errors (as shown in FIG. 8).

Geological experience is used to identify the depth of the bottom-simulating reflector (BSR), which marks the reservoir top, and to pick the reservoir bottom (great positive reflection interface) depths from post-stack seismic profiles, and seismic inversion methods are employed to obtain the P-wave velocity, the impedance profiles, and to calculate the density profiles. Additionally, high-precision pre-stack seismic data can also be used to obtain P-wave velocity and density profiles via amplitude variation with offset and full-waveform inversion methods.

The consolidation factor $$\alpha_0^{ibest}$$

is set for the depth of the submarine gas reservoir bottom, and the P-wave velocity and density profiles $$(V_P^{2D}, \rho^{2D} \text{ or } V_P^{3D}, \rho^{3D})$$

obtained from inversion are combined with rock physics equations and the interior-point algorithm to calculate the free gas saturation and porosity for each depth point in each CDP trace, which are then used to invert the 2D or 3D saturation and porosity distribution profiles (or) (as shown in FIG. 9).

To test the performance of the "five-parameter inversion method" in predicting the 2D distribution profiles of submarine free gas reservoir parameters, this embodiment uses logging data and post-stack seismic data from an undisclosed location for testing. The test results are shown in FIG.

10. The free gas saturation in the 1-2 m below the BSR (3151-3153 m) is relatively high (0.15-0.3), while in other intervals (3153-3170 m) it is lower (0.05-0.15), which aligns well with the logging data. There is a region with higher porosity (3153-3160 m) in the 1-10 m below the BSR. The inversion of free gas saturation and porosity in the 2D profile closely matches the well logging data in the near-well region, thus meeting industrial requirements.

Firstly, through single-well inversion tests at multiple publicly available well locations (such as Hole 1245E, NGHP-01-14A), the method's precision in predicting point reservoir parameters such as free gas saturation and porosity has been accurately verified, providing a reliable foundation for subsequent regional applications. To further extend from "single-well local data" to "regional large-scale data," this embodiment proposes a three-stage core process to play a key role.

The program calculates the sum of mean squared errors between the inversion parameters at different consolidation factors at the bottom of the reservoir and the well logging data, selecting the optimal consolidation factor (as shown in FIG. 8), effectively eliminating the impact of depth differences on the rock elastic model, ensuring consistency in regional inversion parameters.

Secondly, geological experience is combined with the identification of gas reservoir boundaries (BSR and great positive reflection interface), and post-stack/pre-stack seismic inversion is used to obtain P-wave velocity and density profiles, providing large-scale and high-coverage input data for regional reservoir parameter inversion.

Thirdly, the optimal consolidation factor is set as the consolidation factor for the depth of the gas reservoir bottom, and the P-wave velocity/density profiles and rock physics equations, combined with the interior-point algorithm, are used to calculate the reservoir parameters at each depth point for each seismic common depth point (CDP) trace, ultimately inverting the 2D/3D saturation and porosity distribution profiles (as shown in FIG. 9), achieving regional quantitative characterization of the submarine gas reservoir's reservoir parameters.

Finally, by testing with well logging and post-stack seismic data from an undisclosed location (results shown in FIG. 10), the 2D inversion profiles in the near-well region were found to closely match the well logging data, meeting industrial needs for gas reservoir volume evaluation, development well location deployment, and other applications. The method bridges the high precision of single-well inversion with the wide coverage of seismic data, filling the gap in reservoir parameter prediction for areas without wells, thus providing accurate and efficient technical support for submarine gas reservoir exploration and development.

S403, outputting the 2D/3D reservoir parameter distribution profiles and their uses.

Integrating the results. The five reservoir parameter results at each depth point for all CDP traces are integrated based on spatial coordinates (x, y, z), to obtain the 2D reservoir parameter distribution profile and the 3D reservoir parameter distribution profile.

The 2D reservoir parameter distribution profile shows the vertical and horizontal distribution of various reservoir parameters (e.g., $S_g$, $\phi$, etc.) along a specific exploration profile (e.g., the survey line direction), highlighting areas of high porosity or high gas saturation.

The 3D reservoir parameter distribution profile presents the spatial distribution of all reservoir parameters within the entire gas reservoir in a 3D grid format. It can be visualized using slicing, 3D rendering, and other methods to show the 3D aggregation of the parameters.

Estimating the gas reservoir volume. Based on the 3D porosity distribution, the effective reservoir volume is calculated. The gas saturation distribution is combined with the effective reservoir volume to calculate the gas-filled saturation, and finally, the geological gas reservoir volume is obtained using a formula (e.g., "gas volume=gas reservoir area×free gas saturation×porosity"). Development optimization: Based on the reservoir parameter distribution (e.g., high permeability zones, high gas saturation zones), the development well location deployment and fracturing plan design are guided to improve extraction efficiency.

The solution in this embodiment avoids relying on known porosity, mineral composition ratio data, and does not assume the water-gas mixture calibration factor as a fixed constant. It dynamically adapts to changes in the distribution of water-gas mixed fluids, significantly enhancing its applicability in complex geological and data-sparse scenarios, thus solving the data dependency issue faced by existing methods.

For the first time, a five-parameter joint optimization framework for free gas saturation, porosity, clay content, carbonate content, and the water-gas mixture calibration factor is established, and they are unified into the objective function for simultaneous inversion. This breaks the precision bottleneck of traditional separate parameter predictions. Validation with actual drilling and logging data shows a high fit between the inversion results and observed values, with quantitative predictive capabilities superior to traditional methods.

This method is suitable for both single-well logging parameter inversion and regional inversion using 2D/3D seismic P-wave velocity and density profiles, filling the gap in parameter prediction for unobserved areas. The stability of the interior point method optimization strategy is strong, with low sensitivity to initial values. Combined with reasonable parameter constraints, the method quickly converges in diverse geological environments, making it suitable for industrial applications.

Deepwater gas reservoirs face common challenges such as complex geology, difficult data acquisition, and high precision requirements for key parameters. This case solves the data dependency issue and adapts to complex scenarios. The simultaneous inversion of five parameters ensures the precision of key parameters such as free gas saturation and porosity for accurate reservoir volume calculation. The regional inversion covers unobserved areas and guides the development of well locations, ensuring stable application and meeting the core needs of deepwater natural gas exploration and development, such as "precise volume assessment and efficient development optimization."

The device for simultaneous inversion of five reservoir parameters of submarine gas reservoirs using P-wave velocity and density data is disclosed in this disclosure, refer to FIG. 8, it includes the following modules.

Data acquiring and model constructing module 001, acquiring an observed P-wave velocity, an observed density, and a reservoir distribution range through a logging equipment, and measuring an actual valve of a free gas saturation, a porosity, and mineral composition ratios of a rock skeleton to validate inversion accuracy; constructing a P-wave velocity model and a bulk density model of the a reservoir rock using a simplified two-phase Biot equation, a weighted average equation of mixed fluid, and a volume density equation.

Geological experience obtaining and optimization problem constructing module 002, obtaining geological experience of the five reservoir parameters, obtaining experienced range values of a free gas saturation, a range of the porosity, and a range of each of the mineral; setting the free gas saturation, the porosity, a clay content, a carbonate content, and a water-gas mixture calibration factor as unknown variables to be inverted in the P-wave velocity model and the bulk density model; associating the P-wave velocity model with the observed P-wave velocity and the bulk density model with the observed density; and constructing an optimization problem corresponding to multi-dimensional nonlinear with a goal of minimizing a sum of mean squared errors between model-calculated values and observed values, while setting variable ranges for each inverted unknown variables based on the geological experience.

Optimization solution and parameter outputting module 003, after constructing the optimization problem, simultaneously obtaining the five reservoir parameters from logging data and initial iteration values, with the initial iteration values randomly selected within the variable range; using an interior-point algorithm to iteratively solve the optimization problem, adjusting a consolidation factor of reservoir distribution points during a solution process, and judging inversion accuracy by calculating a root mean square error between the inversion result and the observed reservoir parameters, until obtaining a minimum root mean square error; outputting optimal inversion values and consolidation factors for the five reservoir parameters, with the inversion values used to validate inversion accuracy, and the optimal consolidation factor used for predicting a two dimensional (2D) reservoir parameter prediction or a three dimensional (3D) reservoir parameter. The optimal inversion values for the five reservoir parameters are inverted five parameters.

Seismic data inversion and reservoir parameters distribution inversion outputting module 004, during a prediction process of the 2D reservoir parameter prediction or the 3D reservoir parameter, acquiring submarine gas reservoir seismic data collected by a seismic equipment, inverting the submarine gas reservoir seismic data to obtain the 2D P-wave velocity profile or the 3D P-wave velocity profile and a 2D density profile or a 3D density profile; using the optimal consolidation factor, inputting the 2D P-wave velocity profile or 3D P-wave velocity profile, the 2D density profile or the 3D density profile into the optimization problem constructed with the P-wave velocity model and the bulk density model, repeating the inversion process for each seismic common depth point (CDP) trace to invert the five reservoir parameters for each depth point; outputting a 2D reservoir parameter distribution profile or a 3D reservoir parameter distribution profile of the submarine gas reservoir, which is used for reservoir volume evaluation and development optimization.

This disclosure also discloses a system for simultaneous inversion of five reservoir parameters of a submarine gas reservoir using P-wave velocity and density data, including a memory, a processor, and a program for simultaneous inversion of a five reservoir parameters of submarine gas reservoirs using P-wave velocity and density data, wherein the program is executed by the processor to perform steps of the method for simultaneous inversion of five reservoir parameters of the submarine gas reservoirs based on the P-wave velocity and the density mentioned above.

This application also discloses a non-transitory computer-readable storage medium, wherein the non-transitory computer-readable storage medium is configured for storing a program for simultaneous inversion of five reservoir parameters of submarine gas reservoirs using P-wave velocity and density data; when the program is executed by a processor to perform steps of the method for simultaneous inversion of five reservoir parameters of the submarine gas reservoirs based on the P-wave velocity and the density mentioned above.

Although the above embodiments have been shown and described, it is understood that the embodiments are exemplary and not intended to limit the scope of the application. Those skilled in the art may make changes, modifications, substitutions, and variations within the scope of the application.

What is claimed is:

1. A computer-implemented method for simultaneous inversion of five reservoir parameters of submarine gas reservoirs using P-wave velocity and density data, comprising:

acquiring, via a logging equipment, an observed P-wave velocity $$(V_p^{obs}),$$

an observed density $$(\rho_b^{obs}),$$

and a reservoir distribution range, and measuring an actual value of a free gas saturation, a porosity, and mineral composition ratios of a rock skeleton to validate inversion accuracy; constructing a physically-based P-wave velocity model and a bulk density model of the a reservoir rock using a simplified two-phase Biot equation that incorporates a depth-dependent consolidation factor ($\alpha$) which is depth-dependent, a weighted average equation of mixed fluid that uses a calibration factor ($\chi$) to model patchy saturation, and a volume density equation, wherein these models incorporate physical properties of clay, quartz, carbonate, sea water, and natural gas;

obtaining experienced range values of a free gas saturation, a range of the porosity, and a range of each of the mineral composition ratios; setting the free gas saturation ($S_g$), the porosity ($\phi$), a clay content ($V_{clay}$), a carbonate content ($V_{car}$), and a water-gas mixture calibration factor ($\chi$) as five unknown variables to be inverted in the P-wave velocity model and the bulk density model; associating the P-wave velocity model with the observed P-wave velocity and the bulk density model with the observed density; and constructing a multi-dimensional nonlinear constrained optimization problem with a goal of minimizing a sum of mean squared errors between model-calculated values and observed values, while setting physically-based variable ranges for each inverted unknown wherein, $0 \le S_g \le 0.5$, $0 \le V_{clay} \le 1$, $$0 \le V_{car} \le 1,\ 0 \le V_{clay} + V_{car} \le 1,\ 0 \le \chi \le 1;$$

after constructing the optimization problem, simultaneously obtaining values of the five reservoir parameters from logging data and initial iteration values, by using multiple sets of initial iteration values randomly selected within the variable ranges and solving the optimization problem with an interior-point algorithm, while dynamically adjusting the consolidation factor for each of the reservoir distribution points during iteration a solution process; and judging inversion accuracy by calculating a root mean square error between inversion results and the observed reservoir parameters, until convergence; and outputting inversion values for validating inversion accuracy together with a corresponding consolidation factor used for predicting a two dimensional (2D) reservoir parameter prediction or a three dimensional (3D) reservoir parameter;

during a prediction process, acquiring submarine gas reservoir seismic data collected by a seismic equipment, inverting the submarine gas reservoir seismic data, using a post-stack inversion method for post-stack seismic data or an amplitude variation with offset (AVO) inversion method for pre-stack seismic data, to obtain a 2D P-wave velocity profile or a 3D P-wave velocity profile and a 2D density profile or a 3D density profile;

using the corresponding consolidation factor, inputting the 2D P-wave velocity profile or 3D P-wave velocity profile, the 2D density profile or the 3D density profile as inputs to the optimization problem constructed with the P-wave velocity model and the bulk density model, repeating an inversion process of each seismic common depth point (CDP) trace and each depth point to obtain the inverted unknown variables of the five reservoir parameters; outputting a spatially indexed 2D reservoir parameter distribution profile or a spatially indexed 3D reservoir parameter distribution profile of the submarine gas reservoir, thereby enabling improved reservoir volume evaluation and development optimization through spatially-distributed physical parameters of the gas reservoir.

2. The method of claim 1, wherein the bulk modulus $K_s$ of a rock skeleton mineral matrix and the shear modulus us of the rock skeleton mineral matrix are calculated by a Hill formula, and the Hill formula is as follows:

$$K_S = \left\{[V_{clay}K_{clay} + (1 - V_{clay} - V_{car})K_{qua} + V_{car}K_{car}] + \frac{1}{[V_{clay}/K_{clay} + (1 - V_{clay} - V_{car})/K_{qua} + V_{car}/K_{car}]}\right\}/2; \text{ and}$$

$$\mu_S = \left\{[V_{clay}\mu_{clay} + (1 - V_{clay} - V_{car})\ \mu_{qua} + V_{car}\mu_{car}] + \frac{1}{[V_{clay}/\mu_{clay} + (1 - V_{clay} - V_{car})/\mu_{qua} + V_{car}/\mu_{car}]}\right\}/2;$$

wherein, $V_{clay}$ is a volume fraction of the clay in the rock skeleton mineral matrix, and $V_{car}$ is a volume fraction of the carbonate in the rock skeleton mineral matrix.

3. The method of claim 2, wherein the bulk modulus approximate Biot coefficient $\beta_P$ and shear modulus approximate Biot coefficient $\beta_S$ are as follows:

$$\beta_P = \frac{\phi(1+\alpha)}{(1+\alpha\phi)};\ \beta_S = \frac{\phi(1+\gamma\alpha)}{(1+\gamma\alpha\phi)};$$

wherein $$\gamma = \frac{(1+2\alpha)}{(1+\alpha)},\ \alpha = \alpha_0\left(\frac{d_0}{d}\right)^{1/3};$$

$\alpha$ is a consolidation factor at a target point, $\alpha_0$ is a consolidation factor at a reservoir bottom, $d_0$ is a depth of reservoir bottom, d is a target depth, and $\phi$ is the porosity.

4. The method of claim 3, wherein a variable range of the consolidation factor at the reservoir distribution point is $1 \le \alpha_0 \le 15$.

5. The method of claim 1, wherein the mineral composition ratios comprise a clay bulk modulus $K_{clay}$, and a clay shear modulus $\mu_{clay}$, and a quartz bulk modulus $K_{qua}$, and a quartz shear modulus $\mu_{qua}$, and a carbonate bulk modulus $K_{car}$, and a carbonate shear modulus $\mu_{car}$.

6. The method of claim 1, wherein the simplified two-phase Biot equation is as follows:

$$K = K_S(1-\beta_P) + \beta_P^2 K_{av},\ K_{av} = 1/\left(\frac{\beta_P - \phi}{K_S} + \frac{\phi}{K_f}\right),\ \mu = \mu_S(1-\beta_S);$$

wherein, K is an overall bulk modulus of a rock, $K_s$ is a bulk modulus of a rock skeleton mineral matrix, $\mu_S$ is a shear modulus of the rock skeleton mineral matrix, $\beta_P$ is a bulk modulus approximate Biot coefficient, $K_{av}$ is an equivalent bulk modulus, $\phi$ is the porosity, $K_f$ is a water-gas mixed fluid bulk modulus, $\mu$ is the overall shear modulus of the rock, $\mu_S$ is a shear modulus of the rock skeleton mineral matrix, and $\beta_S$ is a shear modulus approximate Biot coefficient.

7. The method of claim 1, wherein, according to the weighted average equation of mixed fluid, the water-gas mixed fluid bulk modulus $K_f$ is expressed as follows:

$$K_f = \chi[(1-S_g)K_w + S_gK_g] + (1-\chi)/[(1-S_g)/K_w + S_g/K_g];$$

wherein $\chi$ is a water-gas mixture calibration factor, and $0 \le \chi \le 1$, $S_g$ is the free gas saturation, $K_w$ is a bulk modulus of liquid water, and $K_g$ is a bulk modulus of free gas.

8. The method of claim 1, wherein the bulk volume equation is as follows:

$$\rho_b = (1-\phi)[V_{clay}\rho_{clay} + (1 - V_{clay} - V_{car})\rho_{qar} + V_{car}\rho_{car}] + (1-S_g)\phi\rho_w + S_g\phi\rho_g;$$

wherein, $\rho_b$ is a reservoir bulk density, $V_{clay}$ is a volume fraction of the clay, $\rho_{clay}$ is a density of the clay, $\rho_{qar}$ is a density of the quartz, $\rho_{car}$ is a density of the carbonate, $\rho_w$ is a density of the liquid water, and $\rho_g$ is a density of the free gas.

9. The method of claim 8, wherein the reservoir P-wave velocity in the P-wave velocity model is as follows:

$$V_P = \sqrt{\frac{K + 4\mu/3}{\rho_b}};$$

wherein, $V_P$ is a reservoir P-wave velocity, K is the overall bulk modulus of a rock, and μ is an overall bulk modulus of the rock matrix.

10. The method of claim 1, wherein an objective function corresponding to multi-dimensional nonlinear constrained optimization problem is as follows:

$$\min f(S_g, \phi, V_{clay}, V_{car}, \chi) = \left[V_p^{obs} - V_p^{mod}(S_g, \phi, V_{clay}, V_{car}, \chi)\right]^2 + \left[\rho_b^{obs} - \rho_b^{mod}(S_g, \phi, V_{clay}, V_{car})\right]^2;$$

wherein, f is the objective function, $V_p^{obs}$ is the observed P-wave velocity, $V_p^{mod}$ is a calculated P-wave velocity from the P-wave velocity model, $\rho_b^{obs}$ is the observed density, and $\rho_b^{mod}$ is a calculated bulk density from the bulk density model.

11. The method of claim 1, wherein the five reservoir parameters comprise the free gas saturation, the porosity, a clay volume fraction, and a carbonate volume fraction from the logging data.

12. The method of claim 1, wherein the root mean square error comprises a first root mean square error between inverted free-gas saturation values and corresponding well-log free-gas saturation values and a second root mean square error between inverted porosity values and corresponding well-log porosity values.

13. The method of claim 1, wherein when solving the optimization problem using the interior-point algorithm, the multiple sets of initial iteration values are randomly selected within the variable range, and the result with the smallest objective function value is selected as the corresponding consolidation factor after solving each set.

14. The method of claim 1, wherein the step of repeating the inversion process comprises:

repeating the following steps: constructing the P-wave velocity model and the bulk density model based on mineral physical property data; setting the free gas saturation, the porosity, the clay content, the carbonate content, and the water-gas mixture calibration factor as unknown variables to be inverted, and constructing the optimization problem with a goal of minimizing the sum of squares of the model calculation values and profile data; using the interior-point algorithm for iterative solving and outputting the five reservoir parameters for each seismic CDP trace depth point.

15. The method of claim 1, wherein the 2D reservoir parameter distribution profile or the 3D reservoir parameter distribution profile comprises: spatial distribution information of the free gas saturation, the porosity, the clay content, the carbonate content, and the water-gas mixture calibration factor in the submarine gas reservoir region; the spatial distribution information corresponds one to one with each seismic CDP trace and each depth point.

16. A system for simultaneous inversion of five reservoir parameters of a submarine gas reservoir using P-wave velocity and density data, comprising a memory, a processor, and a program for simultaneous inversion of a five reservoir parameters of submarine gas reservoirs using P-wave velocity and density data, wherein the program is executed by the processor to perform steps of the method for simultaneous inversion of five reservoir parameters of the submarine gas reservoirs based on the P-wave velocity and the density of claim 1.

17. A non-transitory computer-readable storage medium, wherein the non-transitory computer-readable storage medium is configured for storing a program for simultaneous inversion of five reservoir parameters of submarine gas reservoirs using P-wave velocity and density data; when the program is executed by a processor to perform steps of the method for simultaneous inversion of five reservoir parameters of the submarine gas reservoirs based on the P-wave velocity and the density of claim 1.

18. A device for simultaneous inversion of five reservoir parameters of submarine gas reservoirs using P-wave velocity and density data, comprising:

data acquiring and rock physics modeling module, acquiring, via a logging equipment, an observed P-wave velocity $(V_p^{obs})$, an observed density $(\rho_b^{obs})$, and a reservoir distribution range, and measuring an actual value of a free gas saturation, a porosity, and mineral composition ratios of a rock skeleton to validate inversion accuracy; constructing a physically-based P-wave velocity model and a bulk density model of the a reservoir rock using a simplified two-phase Biot equation that incorporates a depth-dependent consolidation factor (α) which is depth-dependent, a weighted average equation of mixed fluid that uses a calibration factor (χ) to model patchy saturation, and a volume density equation, wherein these models incorporate physical properties of clay, quartz, carbonate, sea water, and natural gas;

geological experience obtaining and optimization problem constructing module, obtaining experienced range values of a free gas saturation, a range of the porosity, and a range of each of the mineral composition ratios; setting the free gas saturation ($S_g$), the porosity (ϕ), a clay content ($V_{clay}$), a carbonate content ($V_{car}$), and a water-gas mixture calibration factor (χ) as five unknown variables to be inverted in the P-wave velocity model and the bulk density model; associating the P-wave velocity model with the observed P-wave velocity and the bulk density model with the observed density; and constructing a multi-dimensional nonlinear constrained optimization problem with a goal of minimizing a sum of mean squared errors between model-calculated values and observed values, while setting physically-based variable ranges for each inverted unknown variable; wherein, $0 \le S_g \le 0.5$, $0 \le V_{clay} \le 1$, $0 \le V_{car} \le 1$, $0 \le V_{clay} + V_{car} \le 1$, $0 \le \chi \le 1$;

optimization solution and parameter outputting module, after constructing the optimization problem, simultaneously obtaining values of the five reservoir parameters from logging data and initial iteration values by using multiple sets of initial iteration values randomly selected within the variable ranges and solving the optimization problem with an interior-point algorithm, while dynamically adjusting the consolidation factor for each of the reservoir distribution points during iteration; and judging inversion accuracy by calculating a root mean square error between inversion results and the observed reservoir parameters, until convergence; and outputting inversion values for validating inversion accuracy together with a corresponding consolidation factor for predicting a two dimensional (2D) reservoir parameter prediction or a three dimensional (3D) reservoir parameter;

seismic data inversion and reservoir parameters distribution inversion outputting module, during a prediction process, acquiring submarine gas reservoir seismic data collected by a seismic equipment, inverting the submarine gas reservoir seismic data, using a post-stack inversion method for post-stack seismic data or an amplitude variation with offset (AVO) inversion method for pre-stack seismic data, to obtain a 2D P-wave velocity profile or a 3D P-wave velocity profile and a 2D density profile or a 3D density profile;

using the corresponding consolidation factor, the 2D P-wave velocity profile or 3D P-wave velocity profile, the 2D density profile or the 3D density profile as inputs to the optimization problem constructed with the P-wave velocity model and the bulk density model, repeating an inversion process of each seismic common depth point (CDP) trace and each depth point to obtain the inverted unknown variables of the five reservoir parameters; outputting a spatially indexed 2D reservoir parameter distribution profile or a spatially indexed 3D reservoir parameter distribution profile of the submarine gas reservoir, thereby enabling improved reservoir volume evaluation and development optimization through spatially-distributed physical parameters of the gas reservoir.

* * * * *